(12) United States Patent
Akkarakaran et al.

(10) Patent No.: US 11,438,052 B2
(45) Date of Patent: Sep. 6, 2022

(54) JOINT TRANSMIT AND RECEIVE BEAM-SWEEPING FOR SIDELINK

(71) Applicant: QUALCOMM Incorporated, San Diego, CA (US)

(72) Inventors: Sony Akkarakaran, Poway, CA (US); Ling Ding, Chester, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/103,232

(22) Filed: Nov. 24, 2020

(65) Prior Publication Data
US 2021/0159963 A1    May 27, 2021

Related U.S. Application Data

(60) Provisional application No. 62/941,685, filed on Nov. 27, 2019.

(51) Int. Cl.
| | | |
|---|---|---|
| *H04B 7/06* | (2006.01) | |
| *H04W 76/14* | (2018.01) | |
| *H04L 1/16* | (2006.01) | |
| *H04W 72/04* | (2009.01) | |
| *H04B 7/08* | (2006.01) | |

(52) U.S. Cl.
CPC ........... *H04B 7/0695* (2013.01); *H04B 7/088* (2013.01); *H04L 1/1607* (2013.01); *H04W 72/046* (2013.01); *H04W 72/0446* (2013.01); *H04W 76/14* (2018.02)

(58) Field of Classification Search
CPC ... H04B 7/0695; H04B 7/088; H04W 72/046; H04W 76/14; H04W 72/0446; H04L 1/1607

USPC ......................................... 375/262, 267, 299
See application file for complete search history.

(56) References Cited

U.S. PATENT DOCUMENTS

| 11,252,730 | B2 * | 2/2022 | Kang ..................... H04W 16/14 |
| 2011/0143692 | A1 * | 6/2011 | Sofer ................... H04B 7/0608 |
| | | | 455/88 |
| 2016/0204507 | A1 * | 7/2016 | Karjalainen ......... H04B 7/0695 |
| | | | 342/372 |

(Continued)

FOREIGN PATENT DOCUMENTS

WO    WO-2019110123 A1    6/2019

OTHER PUBLICATIONS

International Search Report and Written Opinion—PCT/US2020/062149—ISA/EPO—dated Feb. 17, 2021.

*Primary Examiner* — Emmanuel Bayard
(74) *Attorney, Agent, or Firm* — Holland & Hart LLP

(57) ABSTRACT

Methods, systems, and devices for wireless communications are described. A served user equipment (UE) may receive a first configuration signal configuring the served UE with first transmission beam resources and second transmission beam resources for the served UE to use for beam management over a sidelink channel. The served UE may identify, based at least in part on the first configuration signal, a pattern for performing beam management using the first transmission beam resources and the second transmission beam resources. The served UE may perform the beam management over the sidelink channel in accordance with the pattern using the first transmission beam resources and the second transmission beam resources.

30 Claims, 15 Drawing Sheets

(56) References Cited

U.S. PATENT DOCUMENTS

| | | | |
|---|---|---|---|
| 2016/0337886 A1* | 11/2016 | Ohlendorf | H04W 24/06 |
| 2018/0092129 A1* | 3/2018 | Guo | H04W 56/0005 |
| 2018/0343605 A1 | 11/2018 | Wu et al. | |
| 2019/0132852 A1* | 5/2019 | Petersson | H04W 16/28 |
| 2019/0174436 A1* | 6/2019 | da Silva | H04W 16/12 |
| 2020/0252990 A1* | 8/2020 | Ganesan | H04B 7/0632 |

* cited by examiner

JOINT TRANSMIT AND RECEIVE BEAM-SWEEPING FOR SIDELINK

CROSS REFERENCE

The present application for patent claims the benefit of U.S. Provisional Patent Application No. 62/941,685 by AKKARAKARAN et al., entitled "JOINT TRANSMIT AND RECEIVE BEAM-SWEEPING FOR SIDELINK," filed Nov. 27, 2019, assigned to the assignee hereof, and expressly incorporated by reference herein.

BACKGROUND

The following relates generally to wireless communications, and more specifically to joint transmit and receive beam-sweeping for sidelink.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support joint transmit and receive beam-sweeping for sidelink. Generally, the described techniques provide various mechanisms that support wireless communications in a wireless network. Broadly, aspects of the described techniques implement improved beam management techniques over a sidelink channel. For example, two user equipment (UE) may be communicating over a sidelink channel using beamformed transmissions, at least to some degree. A first UE may be configured or otherwise acting as the scheduling UE (e.g., controlling UE) for the sidelink communications, and the first UE may thus be considered the serving UE (e.g., or controlling UE) in this context. A second UE may be configured or otherwise acting as the scheduled UE for the sidelink communications, and the second UE may thus be considered the served UE in this context. The served UE may also be served (e.g., controlled) by any controlling sidelink node (e.g., a base station, controlling UE, master UE, anchor UE, or the like) that coordinates sidelink scheduling. In some aspects, the serving UE may transmit or otherwise provide a configuration signal, e.g., a radio resource control (RRC) configuration or reconfiguration signal, a downlink control information (DCI) signal, or the like, that configures the served UE with multiple periodic/semi-persistent reference signal resources. For example, the serving UE may configure the served UE with first transmission beam resources and second transmission beam resources for the served UE to use for beam management over the sidelink channel. In some other examples, a base station (e.g., or controlling sidelink node) may configure the serving UE, which may in turn configure the served UE. In still other examples, the served UE may receive a sidelink configuration from a base station, but may receive one or more reference signals from the serving UE. In any case, the served UE may identify or otherwise determine a pattern for performing the beam management using the first transmission beam resources and the second transmission beam resources. The served UE may perform the beam management over the sidelink channel according to the pattern and using the first transmission beam resources and the second transmission beam resources. The served UE may transmit or otherwise convey an indication of a feedback message to the serving UE (e.g., or base station) based on the results of the beam management.

A method of wireless communication at a served UE is described. The method may include receiving a first configuration signal configuring the served UE with first transmission beam resources and second transmission beam resources for the served UE to use for beam management over a sidelink channel, identifying, based on the first configuration signal, a pattern for performing beam management using the first transmission beam resources and the second transmission beam resources, and performing the beam management over the sidelink channel in accordance with the pattern using the first transmission beam resources and the second transmission beam resources.

An apparatus for wireless communication at a served UE is described. The apparatus may include a processor, memory coupled with the processor, and instructions stored in the memory. The instructions may be executable by the processor to cause the apparatus to receive a first configuration signal configuring the served UE with first transmission beam resources and second transmission beam resources for the served UE to use for beam management over a sidelink channel, identify, based on the first configuration signal, a pattern for performing beam management using the first transmission beam resources and the second transmission beam resources, and perform the beam management over the sidelink channel in accordance with the pattern using the first transmission beam resources and the second transmission beam resources.

Another apparatus for wireless communication at a served UE is described. The apparatus may include means for receiving a first configuration signal configuring the served UE with first transmission beam resources and second transmission beam resources for the served UE to use for beam management over a sidelink channel, identifying, based on the first configuration signal, a pattern for performing beam management using the first transmission beam resources and the second transmission beam resources, and performing the beam management over the sidelink channel in accordance with the pattern using the first transmission beam resources and the second transmission beam resources.

A non-transitory computer-readable medium storing code for wireless communication at a served UE is described. The code may include instructions executable by a processor to receive a first configuration signal configuring the served UE with first transmission beam resources and second transmission beam resources for the served UE to use for beam management over a sidelink channel, identify, based on the first configuration signal, a pattern for performing beam management using the first transmission beam resources and the second transmission beam resources, and perform the beam management over the sidelink channel in accordance with the pattern using the first transmission beam resources and the second transmission beam resources.

In some examples of the method, apparatuses, and non-transitory computer-readable medium described herein, performing the beam management may include operations, features, means, or instructions for monitoring, using a first receive beam of the served UE, for reference signal transmissions based on the first transmission beam resources, and monitoring for a reference signal transmission based on the second transmission beam resources including repeated transmissions using a same antenna port. Some examples of the method, apparatuses, and non-transitory computer-readable medium described herein may further include operations, features, means, or instructions for monitoring using the first receive beam and monitoring by sweeping the set of receive beams concurrently, consecutively, or using time-division multiplexing.

Some examples of the method, apparatuses, and non-transitory computer-readable medium described herein may further include operations, features, means, or instructions for alternating between monitoring using the first receive beam and monitoring by sweeping the set of receive beams between successive symbols, or successive mini-slots, or successive slots, or successive subframes, or a combination thereof.

Some examples of the method, apparatuses, and non-transitory computer-readable medium described herein may further include operations, features, means, or instructions for transmitting a first feedback message identifying a result of the monitoring using the first receive beam, and transmitting a second feedback message identifying a result of the monitoring by sweeping the set of receive beams.

Some examples of the method, apparatuses, and non-transitory computer-readable medium described herein may further include operations, features, means, or instructions for identifying, based on monitoring using the first receive beam of the served UE, one or more transmit beam candidates from reference signal transmissions, transmitting a feedback message identifying the one or more transmit beam candidates, and resetting the second transmission beam resources based on the feedback message.

In some examples of the method, apparatuses, and non-transitory computer-readable medium described herein, performing the beam management may include operations, features, means, or instructions for monitoring for a first reference signal transmission based on the first transmission beam resources including first repeated transmissions using a same first antenna port, and monitoring for a second reference signal transmission based on the second transmission beam resources including second repeated transmissions using a same second antenna port. Some examples of the method, apparatuses, and non-transitory computer-readable medium described herein may further include operations, features, means, or instructions for monitoring for the first reference signal transmission by sweeping a set of receive beams for the served UE concurrently, consecutively, or using time-division multiplexing with monitoring for the second reference signal transmission by sweeping the set of receive beams.

Some examples of the method, apparatuses, and non-transitory computer-readable medium described herein may further include operations, features, means, or instructions for alternating between monitoring for the first reference signal transmission and monitoring for the second reference signal transmission between successive symbols, or successive mini-slots, or successive slots, or successive subframes, or a combination thereof.

Some examples of the method, apparatuses, and non-transitory computer-readable medium described herein may further include operations, features, means, or instructions for transmitting a first feedback message identifying a result of the monitoring for the first reference signal transmission, and transmitting a second feedback message identifying a result of the monitoring for the second reference signal transmission.

In some examples of the method, apparatuses, and non-transitory computer-readable medium described herein, performing the beam management may include operations, features, means, or instructions for monitoring, using a first receive beam of the served UE, for reference signal transmissions from the serving UE based on the first transmission beam resources, and monitoring for multiple instances of a second reference signal transmission based on the second transmission beam resources including repeated transmissions using a same antenna port.

Some examples of the method, apparatuses, and non-transitory computer-readable medium described herein may further include operations, features, means, or instructions for monitoring for the reference signal transmissions and monitoring for the multiple instances of the second reference signal transmission concurrently, consecutively, or using time division multiplexing.

Some examples of the method, apparatuses, and non-transitory computer-readable medium described herein may further include operations, features, means, or instructions for alternating between monitoring for the first reference signal transmission and monitoring for the multiple instances of the second reference signal transmission between successive symbols, or successive mini-slots, or successive slots, or successive subframes, or a combination thereof.

Some examples of the method, apparatuses, and non-transitory computer-readable medium described herein may further include operations, features, means, or instructions for transmitting a first feedback message identifying a result of the monitoring for the reference signal transmissions, transmitting a second feedback message identifying a result of the monitoring for the multiple instances of the second reference signal transmission, and resetting the second transmission beam resources based on at least one of the first feedback message, or the second feedback message, or a combination thereof.

In some examples of the method, apparatuses, and non-transitory computer-readable medium described herein, the first transmission beam resources correspond to a first set of reference signal resource sets, and the second transmission beam resources corresponding to a second set of reference signal resource sets.

In some examples of the method, apparatuses, and non-transitory computer-readable medium described herein, the first configuration signal configures the first transmission beam resources as a first set of reference signal resources and a second set of reference signal resources, and configures the second transmission beam resources as a third set of transmission beam resources, with the second set of reference signal resources and the third set of reference signal resources being configured with repetition enabled for the beam management.

In some examples of the method, apparatuses, and non-transitory computer-readable medium described herein, the first transmission beam resources include a first channel state information reference signal (CSI-RS) resource set and the second transmission beam resources include a second CSI-RS resource set.

In some examples of the method, apparatuses, and non-transitory computer-readable medium described herein, the first transmission beam resources include a first subset of a CSI-RS resource set and the second transmission beam resources include a second subset of the CSI-RS resource set.

A method of wireless communication is described. The method may include transmitting a first configuration signal configuring a served UE with first transmission beam resources and second transmission beam resources of a serving UE for the served UE to use for beam management over a sidelink channel, transmitting one or more first reference signals using the first transmission beam resources and one or more second reference signals using the second transmission beam resources, and receiving a feedback message based on the transmissions of the one or more first reference signals, the one or more second reference signals, or both.

An apparatus for wireless communication is described. The apparatus may include a processor, memory coupled with the processor, and instructions stored in the memory. The instructions may be executable by the processor to cause the apparatus to transmit a first configuration signal configuring a served UE with first transmission beam resources and second transmission beam resources of a serving UE for the served UE to use for beam management over a sidelink channel, transmit one or more first reference signals using the first transmission beam resources and one or more second reference signals using the second transmission beam resources, and receive a feedback message based on the transmissions of the one or more first reference signals, the one or more second reference signals, or both.

Another apparatus for wireless communication is described. The apparatus may include means for transmitting a first configuration signal configuring a served UE with first transmission beam resources and second transmission beam resources of a serving UE for the served UE to use for beam management over a sidelink channel, transmitting one or more first reference signals using the first transmission beam resources and one or more second reference signals using the second transmission beam resources, and receiving a feedback message based on the transmissions of the one or more first reference signals, the one or more second reference signals, or both.

A non-transitory computer-readable medium storing code for wireless communication is described. The code may include instructions executable by a processor to transmit a first configuration signal configuring a served UE with first transmission beam resources and second transmission beam resources of a serving UE for the served UE to use for beam management over a sidelink channel, transmit one or more first reference signals using the first transmission beam resources and one or more second reference signals using the second transmission beam resources, and receive a feedback message based on the transmissions of the one or more first reference signals, the one or more second reference signals, or both.

Some examples of the method, apparatuses, and non-transitory computer-readable medium described herein may further include operations, features, means, or instructions for selecting, based on the feedback message, at least one of a third transmission beam resources, and transmitting a second configuration signal to the served UE identifying the third transmission beam resources as a replacement for the first transmission beam resources or the second transmission beam resources.

In some examples of the method, apparatuses, and non-transitory computer-readable medium described herein, receiving the feedback message may include operations, features, means, or instructions for receiving, based on the one or more first reference signals, a first feedback message, and receiving, based on the one or more second reference signals, a second feedback message.

In some examples of the method, apparatuses, and non-transitory computer-readable medium described herein, the transmissions of the one or more first reference signals and the one or more second reference signals may be concurrently, consecutively, or using time-division multiplexing. In some examples of the method, apparatuses, and non-transitory computer-readable medium described herein, the transmissions of the one or more first reference signals and the one or more second reference signals may be performed between successive symbols, or successive mini-slots, or successive slots, or successive subframes, or a combination thereof.

In some examples of the method, apparatuses, and non-transitory computer-readable medium described herein, the first transmission beam resources include a first CSI-RS resource set and the second transmission beam resources include a second CSI-RS resource set. In some examples of the method, apparatuses, and non-transitory computer-readable medium described herein, the first transmission beam resources include a first subset of a CSI-RS resource set and the second transmission beam resources include a second subset of the CSI-RS resource set.

DETAILED DESCRIPTION

Figure 1:
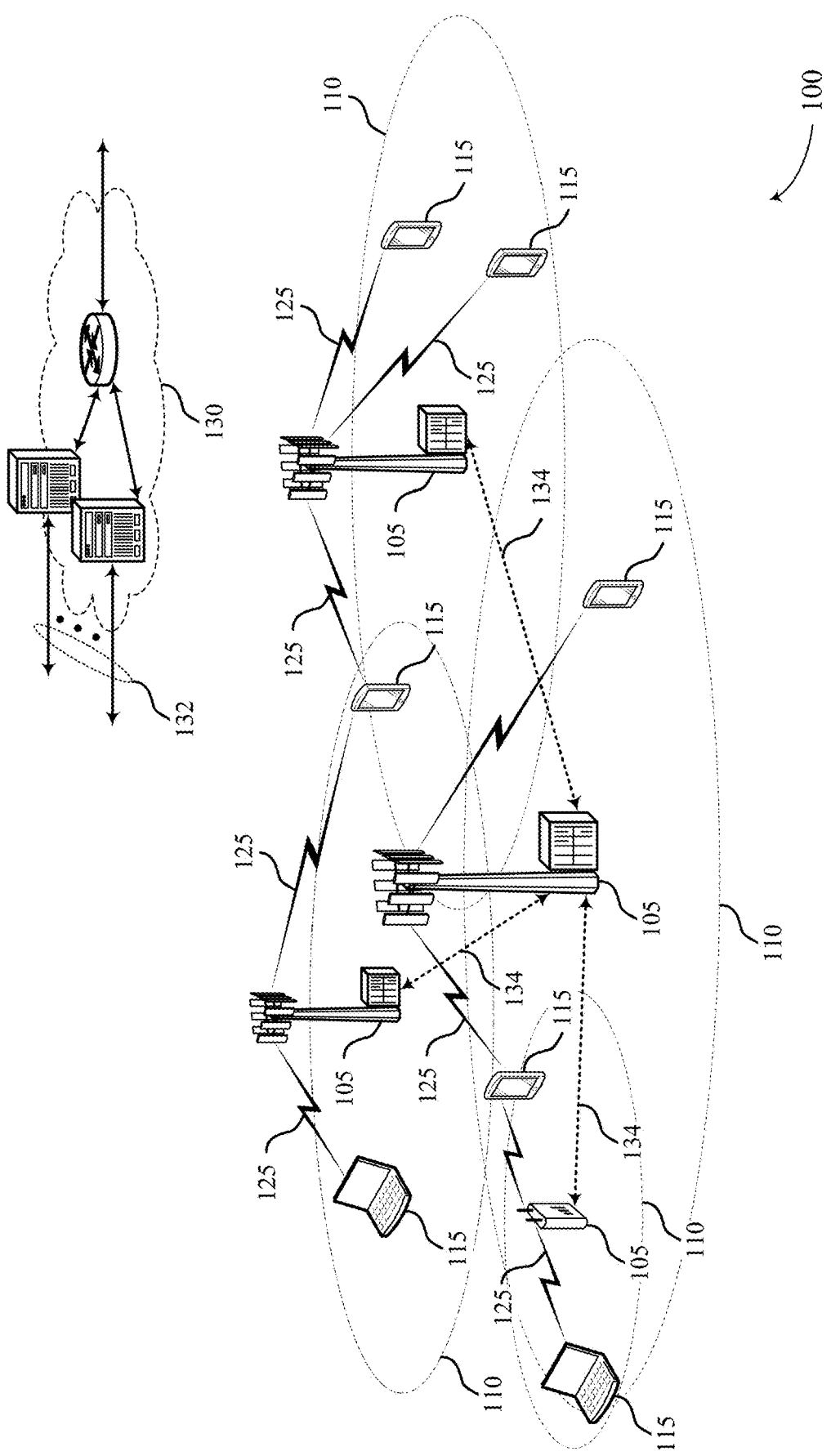
FIG. 1 illustrates an example of a system for wireless communications that supports joint transmit and receive beam-sweeping for sidelink in accordance with aspects of the present disclosure.

Wireless communications using beamformed techniques, at least to some degree, require the participating wireless devices to perform beam management to identify and maintain an active beam for communications. The beam management may include one wireless device transmitting beamformed reference signals while the other wireless device identifies a candidate beam from the beamformed transmissions. This process may continue using increasingly narrower beamformed transmissions until the preferred or best beams (e.g., best transmit beam at the transmitting device and best receive beam at the receiving device) are identified. However, such techniques are generally performed in a step approach involving reference signal transmission, feedback message exchanges, and new beams being identified and configured. This iterative process consumes substantial resources (e.g., based on multiple configuration messages and feedback messages being exchanged) and takes considerable time to complete or maintain. This approach may be even more problematic in a situation where two UEs are communicating over a sidelink channel. For example, beam management between the two UEs must account for the fact that both UEs are likely mobile and, in some situations, are experiencing a high rate of mobility. This may frustrate such beam management techniques, which may result in a loss of communications between the two UEs.

Aspects of the disclosure are initially described in the context of a wireless communications system. Broadly, aspects of the described techniques implement improved beam management techniques over a sidelink channel. For example, two UEs may be communicating over a sidelink channel using beamformed transmissions, at least to some degree. One UE may be configured or otherwise acting as the scheduling UE for the sidelink communications, which may be considered the serving UE in this context. The other UE may be configured or otherwise acting as the scheduled UE for the sidelink communications, which may be considered the served UE in this context. The served UE may also be served (e.g., controlled) by any controlling sidelink node (e.g., a base station, controlling UE, master UE, anchor UE, or the like) that coordinates sidelink scheduling. In some aspects, the serving UE may transmit or otherwise provide a configuration signal, e.g., a radio resource control (RRC) configuration or reconfiguration signal, a downlink control information (DCI) signal, or the like, that configures the served UE with multiple periodic/semi-persistent reference signal resources. For example, the serving UE may configure the served UE with first transmission beam resources and second transmission beam resources for the served UE to use for beam management over the sidelink channel. In some other examples, a base station may configure (e.g., via a downlink channel) the serving UE, which may in turn configure (e.g., via a sidelink channel) the served UE. In still other examples, the served UE may receive a configuration from a base station and may receive reference signals from the serving UE. In any case, the served UE may identify or otherwise determine a pattern for performing the beam management using the first transmission beam resources and the second transmission beam resources. The served UE may perform the beam management over the sidelink channel according to the pattern and using the first transmission beam resources and the second transmission beam resources. The served UE may transmit or otherwise convey an indication of a feedback message to the serving UE (e.g., or base station) based on the results of the beam management.

Aspects of the disclosure are further illustrated by and described with reference to apparatus diagrams, system diagrams, and flowcharts that relate to joint transmit and receive beam-sweeping for sidelink.

FIG. 1 illustrates an example of a wireless communications system 100 that supports joint transmit and receive beam-sweeping for sidelink in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 (e.g., when configured or otherwise acting as a served UE 115 communicating with a serving UE 115 over a sidelink channel) may receive, from the serving UE 115 and over a sidelink channel, a first configuration signal configuring the served UE 115 with first transmission beam resources and second transmission beam resources of the serving UE 115 for the served UE 115 to use for beam management over the sidelink channel. The UE 115 may identify, based at least in part on the first configuration signal, a pattern for performing beam management using the first transmission beam resources and the second transmission beam resources. The UE 115 may perform the beam management over the sidelink channel in accordance with the pattern using the first transmission beam resources and the second transmission beam resources.

A UE 115 (e.g., when configured or otherwise acting as a serving UE 115 communicating with a served UE 115 over a sidelink channel) may transmit, to a served UE 115 and over a sidelink channel, a first configuration signal configuring the served UE 115 with first transmission beam resources and second transmission beam resources of the serving UE 115 for the served UE 115 to use for beam management over the sidelink channel. The UE 115 may transmit one or more of a first reference signals using the first transmission beam resources and one or more of a second reference signals using the second transmission beam resources. The UE 115 may receive a feedback message from the served UE based at least in part on the transmissions of the one or more first reference signals and the one or more second reference signals.

Figure 2:
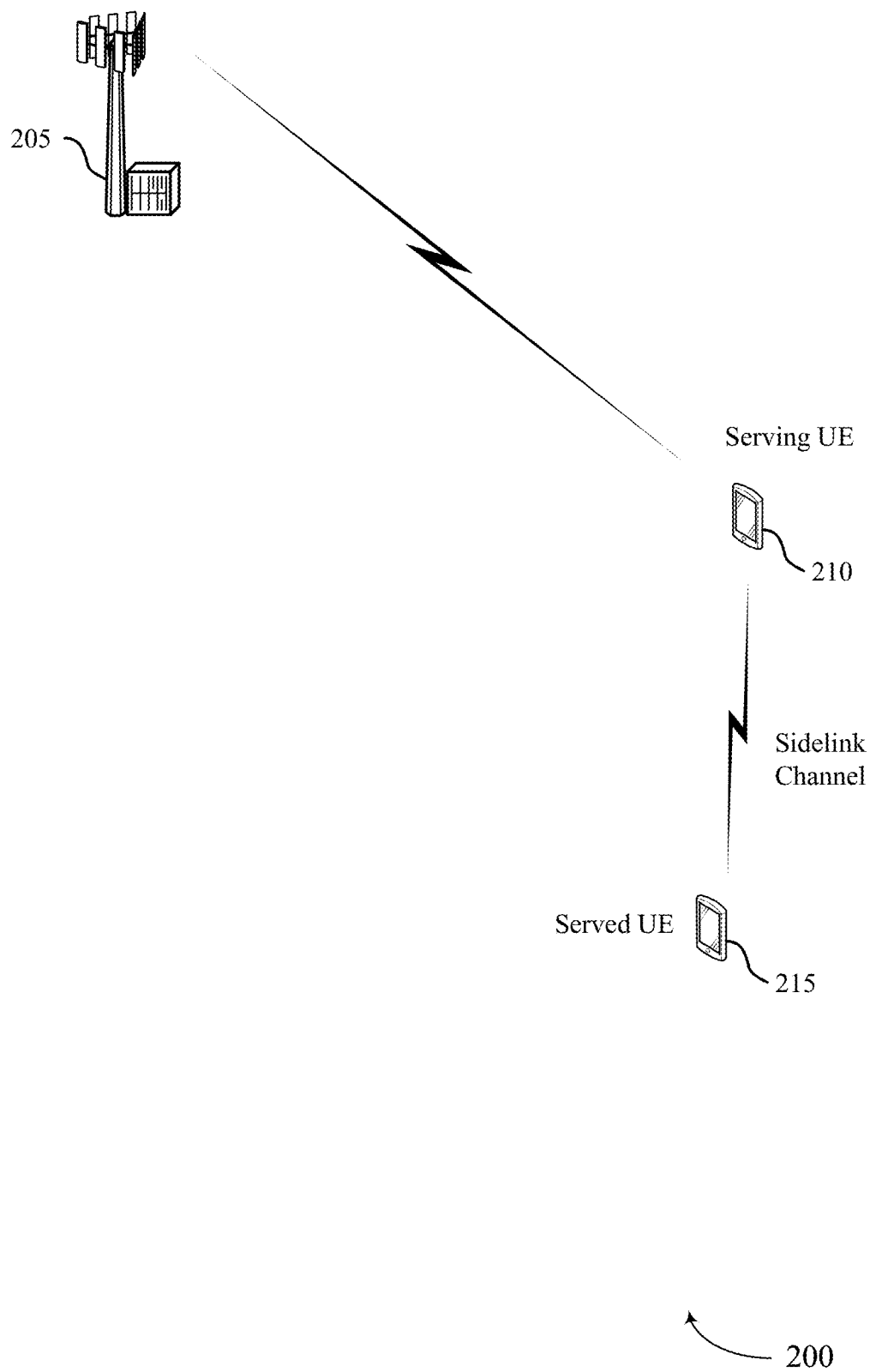
FIG. 2 illustrates an example of a wireless communication system that supports joint transmit and receive beam-sweeping for sidelink in accordance with aspects of the present disclosure.

FIG. 2 illustrates an example of a wireless communication system 200 that supports joint transmit and receive beam-sweeping for sidelink in accordance with aspects of the present disclosure. In some examples, wireless communication system 200 may implement aspects of wireless communication system 100. Wireless communication system 200 may include a base station 205, a serving UE 210, and a served UE 215, which may be examples of the corresponding devices described herein. In some aspects, serving UE 210 and served UE 215 may be communicating over a sidelink channel using beamformed transmissions, at least to some degree.

As described herein, serving UE 210 and served UE 215 may be performing wireless communications over a sidelink channel. In one mode, the sidelink communications may be controlled (e.g., coordinated, scheduled, allocated, etc.) by base station 205. For example, base station 205 may receive information from serving UE 210 and/or served UE 215 indicating that sidelink communications are to be performed, e.g., in a scheduling request, buffer status report, etc. Accordingly, base station 205 may allocate appropriate resources and convey those resources in a grant to serving UE 210 and/or served UE 215.

In another mode, serving UE 210 may also be considered a controlling sidelink UE, such that serving UE 210 acts as the scheduling entity for the sidelink communications with served UE 215. That is, the sidelink communications may be controlled (e.g., coordinated, scheduled, allocated, etc.) by serving UE 210 with respect to the sidelink communications being performed between served UE 215 and serving UE 210. Accordingly, serving UE 210 may schedule and allocate the appropriate resources and convey those resources to served UE 215. In some cases, serving UE 210 may be considered a controlling sidelink UE when the serving UE 210 and the served UE 215 (e.g., and one or more other UEs served or otherwise controlled by serving UE 210) are out of base station coverage (e.g., such as a programmable logic controller (PLC) in an industrial Internet-of-Things (IIoT) scenario). The serving UE 210 may thus be designated as a master or anchor UE, and may act as the scheduling entity for the served UE 210 and any other UEs controlled by the serving UE 210.

In some aspects, communications between base station 205, serving UE 210, and/or served UE 215 may be performed using at least some degree of beamformed transmissions. For example, the beamformed transmissions may include the transmitting device using one or more transmit beams and the receiving device using one or more receive beams during the communications. In some aspects, the sidelink communications between serving UE 210 in served UE 215 may also include beamformed transmissions, at least to some degree.

In some examples, base station 205 may manage or otherwise control one or more aspects of beam management with respect to the beamformed communications. With respect to the sidelink communications, this may include serving UE 210 managing or otherwise controlling one or more aspects of the beam management for the sidelink communications. For example, base station 205 may manage beam management with respect to serving UE 210 and serving UE 210 may manage beam management with respect to served UE 215. For illustration purposes only, aspects of the techniques described herein will be performed in the situation where serving UE 210 acts as, or is otherwise configured as, the scheduling entity for communications over the sidelink channel with served UE 215. Accordingly, aspects of the described techniques support serving UE 210 controlling or otherwise managing aspects of beam management for the sidelink communications.

Generally, such beam management techniques may utilize various transmit beams with a decreasing beam width in order to identify or otherwise determine the best transmit/receive beam pair. For example, serving UE 210 may initially transmit an RRC configuration or a reconfiguration message that may be used to configure a channel state information reference signal (CSI-RS) resource set. The CSI-RS resource set may correspond to a synchronization signal block (SSB) waveform, which in some examples may use a P1 beam, which may be a broad beam waveform. Serving UE 210 may then transmit (e.g., sweep) an SSB in an iterative fashion using the P1 beam. That is, serving UE 210 may sweep SSB transmissions using the P1 beam for each receive beam of served UE 215. Served UE 215 may, for each receive beam, identify the best candidate P1 beam (e.g., based on the reference signal received power (RSRP), reference signal received quality (RSRQ), and the like). Similarly, served UE 215 may identify its best receive beam corresponding to the candidate P1 beam. Served UE 215 may transmit a feedback message indicating the top N candidate P1 beam(s), with N being a positive integer value of one or more. Serving UE 210 may identify or otherwise select the best or active P1 beam (e.g., the active P1 beam). Based on the identified P1 beam, serving UE 210 may identify one or more P2 beams to use for sidelink communications. Serving UE 210 may transmit an RRC configuration signal to configure the CSI-RS resource set that may be spatially quasi-co-location (QCL) with the active P1 beam. That is, serving UE 210 may select the set of candidate P2 beams based on the feedback message and configure the served UE 215 with the P2 candidate beams. The P2 beams generally refers to beams having a narrower beam width with respect to the P1 beam. The P2 beams may generally be allocated for reference signal transmission, such as CSI-RS transmissions using the P2 beams.

Serving UE 210 may sweep all of the CSI-RS beams (e.g., CSI-RS transmissions using multiple P2 beams from the set of candidate P2 beams) in the configured CSI-RS resource set. Served UE 215 may, based on the CSI-RS transmissions using the candidate P2 beams, identify the top N candidate P2 beam(s), with N being a positive integer value of one or more. In some aspects, served UE 215 may identify the candidate P2 beams based on the SSB transmissions swept using the set of candidate P2 beams. Served UE 215 may then transmit another feedback message to serving UE 210 identifying the top N candidate P2 beam(s). Based on the second feedback message, serving UE 210 may identify or otherwise select the serving or active CSI-RS beam, e.g., may identify the P3 beam to use for communicating with served UE 215. The P3 beam may generally refer to a beam having a narrower beam width than the P1 beam.

Serving UE 210 may transmit on the CSI-RS beam (e.g., the P3 beam) CSI-RS transmissions. Served UE 215 may sweep its receive beams to detect the CSI-RS transmission on the P3 beam to identify the best or active receive beam. Accordingly, serving UE 210 and served UE 215 may perform this beam management procedure in order to maintain the best (e.g., with respect to performance capability, a RSRP, etc.) beam pair, which includes the P3 beam of serving UE 210 and the receive beam of served UE 215 corresponding to that P3 beam. The serving UE 210 and served UE 215 may use this beam pair for sidelink communications over the sidelink channel. Serving UE 210 and served UE 215 may continue to use this beam management technique to identify and select new active beam pairs for the sidelink communications.

In some examples, served UE 215 may receive sidelink communications information and beam management information from both serving UE 210 and base station 205. For instance, served UE 215 may receive, from base station 205, a sidelink configuration for the sidelink communications, and may receive one or more sidelink reference signals (e.g., to be used for beam sweeping) from serving UE 210.

While this beam management approach may be suitable with respect to base station 205, there may be difficulties when implemented between serving UE 210 and served UE 215. That is, base station 205 is generally fixed in location, whereas serving UE 210 and served UE 215 may both be mobile. Beam management in general is more critical when both serving UE 210 and served UE 215 are mobile. That is, due to UE mobility, the best or active beam pair may change much more frequently for either or both devices. Thus, both devices may adopt the beam management technique discussed above. However, this may result in a significant cost increase in terms of over-the-air message exchanges and time. In a worst-case scenario, this may result in a complete loss of communications over the sidelink channel between serving UE 210 and served UE 215.

Additionally, some wireless communication systems are configured such that only one periodic/semi-persistent CSI-RS resource set can be configured for beam management. This results in the P1/P2 (transmit beam sweep) and the P3 (receive beam sweep) discussed above not being able to be performed in parallel.

However, aspects of the described techniques enable both the P2 and P3 beam management techniques to be performed in parallel. For example, the serving UE 210 may configure the served UE 215 with first transmission beam resources and second transmission beam resources of the serving UE 210. That is, serving UE 210 may transmit or otherwise convey a first configuration signal (e.g., an RRC configuration/reconfiguration signal, DCI, etc.) to served UE 215 configuring CSI-RS resources on the first transmission beam resources and the second transmission beam resources. As one example, this may include the first transmission beam resources corresponding to a first CSI-RS resource set and the second transmission beam resources corresponding to a second CSI-RS resource set, e.g., P2/P3 beams. In another example, the first transmission beam resources may correspond to a first subset of a CSI-RS resource set and the second transmission beam resources may correspond to a second subset of the CSI-RS resource set, e.g., P2 and/or P3a/b beams.

Served UE 215 may receive the configuration signal and identify a pattern for performing beam management using the first transmission beam resources and the second transmission beam resources. That is, served UE 215 may determine whether the first transmission beam resources and the second transmission be resources correspond to different CSI-RS resource sets or to subsets of a CSI-RS resource set. Accordingly, served UE 215 may perform the beam management over the sidelink channel according to the pattern and using the first transmission beam resources and the second transmission beam resources.

In one aspect, the pattern may include served UE 215 monitoring for reference signal transmissions from the serving UE 210 over the first transmission beam resources and monitoring for a reference signal transmission from the serving UE 210 over the second transmission beam resources. That is, the configuration signal may configure P2 (e.g., the first transmission beam resources used for first CSI-RS transmissions) and P3 (e.g., the second transmission beam resources used for second CSI-RS transmissions) beams for served UE 215. In some aspects, served UE 215 monitoring the first transmission beam resources may include served UE 215 using a first receive beam to monitor for CSI-RS transmissions using the P2 beams transmitted from serving UE 210. In some aspects, served UE 215 monitoring the second transmission beam resources may include served UE 215 sweeping a set of receive beams to monitor for a CSI-RS transmission using the P3 beam transmitted from serving UE 210. The monitoring may be performed concurrently (e.g., served UE 215 may monitor for both P2 and P3 beam CSI-RS transmissions) or consecutively (e.g., served UE 215 may monitor for P2 beam CSI-RS transmissions, and then monitor for P3 beam CSI-RS transmissions, or vice versa). In some aspects, the monitoring may be performed at the symbol boundary, mini-slot boundary, slot boundary, subframe boundary, etc.

In another aspect, the pattern may include served UE 215 monitoring for reference signal transmissions from the serving UE 210 by sweeping its receive beams. That is, the configuration signal may configure two sets of P3 beams (e.g., the first transmission beam resources corresponding to a P3a beam for CSI-RS transmissions and the second transmission beam resources corresponding to a P3b beam for CSI-RS transmissions). Accordingly, served UE 215 may sweep a set of receive beams to monitor for a first instance of a reference signal transmission using the first transmission beam resources (e.g., the CSI-RS transmissions using the P3a beam), and may sweep its receive beams to monitor for a second instance of the reference signal transmission using the second transmission beam resources (e.g., the CSI-RS transmissions using the P3b beam).

In some aspects, served UE 215 may transmit or otherwise convey one or more feedback message(s) during the beam management procedure. The feedback message(s) may be transmitted (e.g., to the serving UE 210, the base station 205, or any serving or controlling sidelink node) according to the pattern and/or based on the configured first transmission beam resources and second transmission beam resources. That is, served UE 215 may transmit the feedback message(s) during the beam management procedure based on the determination that one or more beams need to be updated by serving UE 210. For example, served UE 215 may be performing the beam management according to the techniques discussed herein and may determine that one or more of the active transmit and/or receive beams is degrading and/or that a new candidate transmit and/or receive beam has been identified. Accordingly, serving UE 210 may, based on any received feedback message, identify or otherwise select new first and/or second transmission beam resources (e.g., third transmission beam resources) for the serving UE 210. Serving UE 210 may transmit another configuration signal (e.g., RRC configuration/reconfiguration signal, DCI, etc.) identifying the updated transmission beam resources (e.g., the third transmission beam resources).

Accordingly, aspects of the described techniques support more frequent beam training on sidelink due to mobility at both serving UE 210 and served UE 215. The CSI-RS-resource set (e.g., the first and/or second transmission beam resources) is configured with repetition flag 'on' for the same transmit beam. Whereas previous configurations prevented simultaneous beam management using both P2 and P3 beams, aspects of the described techniques support simultaneous beam management using both P2 and P3 (or P3a/P3b) beams. In some aspects, repetition may be set as 'off' for the P2 beam and 'on' for the P3 beam.

In one example, two sets of beams are configured, e.g., one configured with P2, one with P3. The P3 training may be 'reset' whenever the transmit beam is reconfigured as a result of P2 beam reports.

In another example, two sets of P3 beams are configured, each with repetition 'on', but working on different transmit beams (e.g., P3a/P3b). Examples of the pattern with both repeat plus transmit sweep include (aabbcc) and (abcabc) being on, depending on the time-domain placement of resources in each transmission beam resources set. It should be noted that the example of two sets is for illustration purposes only. That is, the first configuration signal may configure N transmission beam resource sets (with N being a positive integer of two or more). The serving UE 210 may decide between the configured sets depending on how fast the served UE 215 can switch its beam.

In some aspects, the pattern interleaving (aabbcc or abcabc) could be at the symbols level, mini-slot level, slot-level, multi-slot level, subframe level, etc. based on the resource configuration and periodicity assigned in each set.

In another option, there may be a plurality of transmission beam resource sets configured by the first configuration signal. For example, the first transmission beam resources may correspond to a first plurality of reference signal resource sets (e.g., multiple P2 beams) and the second transmission beam resources may correspond to a second plurality of reference signal resource sets (e.g., multiple P3 beams).

In some aspects, one or more of the options discussed above may allow more flexible repetition configurations. For example, some configurations may support repetition being set to 'on' for all resources having the same transmit beam. Instead, some options may have subsets of resources with the same transmit beam, and different subsets of resources may mean or refer to different transmit beams. The subsets can be explicitly indicated using a resource index or resource assignment (e.g., based on OFDM symbols and/or slots occupied) and may use pattern indications such as aabbcc, abcabc, and the like.

That is, one transmission beam resource set may have both CSI-RS resources sets for P2 and P3 beams and more than one CSI-RS resource set for the P3 beam by including a resource index, resource assignment, and the like. In previous configurations, repetition per resource set is not able to put the CSI-RS resources for P2 and P3 beams into one set, and are not able to put more than one CSI-RS beam for P3 into one set. However, according to aspects of the described techniques the first configuration signal may configure P2 with repetition 'off' since more than one serving UE 210 beams are swept and configure P3 with repetition 'on' since the serving UE 210 beam is fixed (e.g., only one CSI-RS beam).

Figure 3:
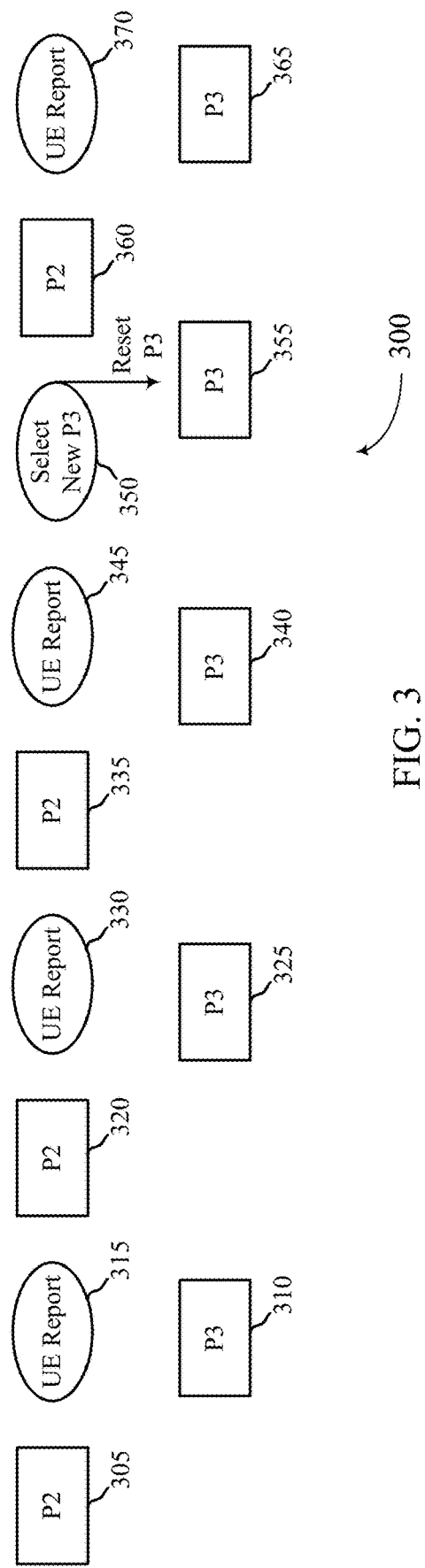
FIG. 3 illustrates an example of a beam management configuration that supports joint transmit and receive beam-sweeping for sidelink in accordance with aspects of the present disclosure.

FIG. 3 illustrates an example of a beam management configuration 300 that supports joint transmit and receive beam-sweeping for sidelink in accordance with aspects of the present disclosure. In some examples, beam management configuration 300 may implement aspects of wireless communication systems 100 and/or 200. Aspects of beam management configuration 300 may be implemented by a serving UE and/or a served UE, which may be examples of corresponding devices described herein. In some aspects, the serving UE and the served UE may be performing wireless communications over a sidelink channel, with the serving UE acting as the scheduling entity for the sidelink communications.

As discussed herein, aspects of the described techniques provide for the serving UE to transmit or otherwise convey a first configuration signal (e.g., RRC configuration/reconfiguration signal, DCI, etc.) configuring the served UE with the first transmission beam resources and the second transmission beam resources of the serving UE. The served UE may use the first and second transmission beam resources for beam management over the sidelink channel. In the example illustrated in beam management configuration 300, the first transmission beam resources correspond to a first CSI-RS resource set transmitted from the serving UE using P2 beams and the second transmission beam resources correspond to a second CSI-RS resource set transmitted from the serving UE using a P3 beam. The served UE may determine or otherwise identify a pattern for performing beam management using the first transmission beam resources and the second transmission beam resources. The pattern illustrated in beam management configuration 300 is ababab, where 'a' represents the CSI-RS transmissions using the P2 beams and 'b' represents the CSI-RS transmissions using the P3 beam. The served UE may perform the beam management according to the pattern and, in some aspects, based on the first transmission beam resources and the second transmission beam resources.

In some aspects, this may include the serving UE sweeping CSI-RS transmissions over each P2 beam 305, for each served UE receive beam, in the first CSI-RS resource set (e.g., the first transmission beam resources). Concurrently or consecutively, the serving UE may transmit CSI-RS over the P3 beam 310, with the served UE sweeping its receive beams in the second CSI-RS resource set (e.g., the second transmission beam resources). The served UE may transmit a feedback message 315 based on the CSI-RS transmissions over the P2 and/or P3 beams. This process may repeat again by the serving UE sweeping CSI-RS transmissions over each P2 beam 320, for each served UE receive beam, in the first CSI-RS resource set (e.g., the first transmission beam resources). Concurrently or consecutively, the serving UE may transmit CSI-RS over the P3 beam 325, with the served UE sweeping its receive beams, in the second CSI-RS resource set (e.g., the second transmission beam resources). The served UE may transmit a feedback message 330 based on the CSI-RS transmissions over the P2 and/or P3 beams. This process may repeat yet again by the serving UE sweeping CSI-RS transmissions over each P2 beam 335, for each served UE receive beam, in the first CSI-RS resource set (e.g., the first transmission beam resources). Concurrently or consecutively, the serving UE may transmit CSI-RS over the P3 beam 340, with the served UE sweeping its receive beams, in the second CSI-RS resource set (e.g., the second transmission beam resources). The served UE may transmit a feedback message 345 based on the CSI-RS transmissions over the P2 and/or P3 beams.

The serving UE may identify or otherwise select new or updated transmission beam resources (e.g., a third transmission beam resources) based on one or more of the feedback messages received from the served UE. That is, each feedback message may identify a candidate P3 beam for the serving UE to use and/or may simply identify a result of the served UE monitoring the CSI-RS transmissions using the P2 and/or P3 beams (e.g., may simply indicate the RSRP values). Accordingly, the serving UE may transmit a second configuration signal (e.g., RRC configuration/reconfiguration signal) identifying a new transmission beam resource (e.g., updated CSI-RS resource set using the P3 beam 355).

The process may continue by the serving UE sweeping CSI-RS transmissions over each P2 beam 360, for each served UE receive beam, in the first CSI-RS resource set (e.g., the first transmission beam resources). Concurrently or consecutively, the serving UE may transmit CSI-RS over the P3 beam 365, with the served UE sweeping its receive beams, in the second CSI-RS resource set (e.g., the updated or third transmission beam resources). The served UE may transmit a feedback message 370 based on the CSI-RS transmissions over the P2 and/or updated P3 beams.

Figure 4A:
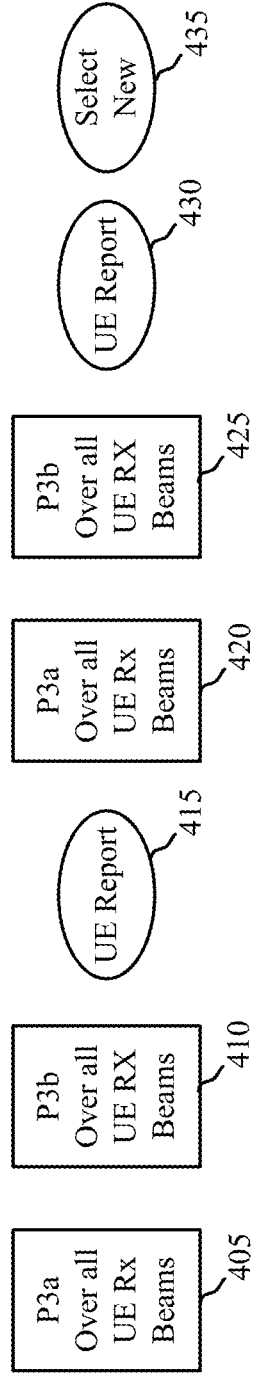
FIGS. 4A and 4B illustrate examples of a beam management configuration that supports joint transmit and receive beam-sweeping for sidelink in accordance with aspects of the present disclosure.
Figure 4B:
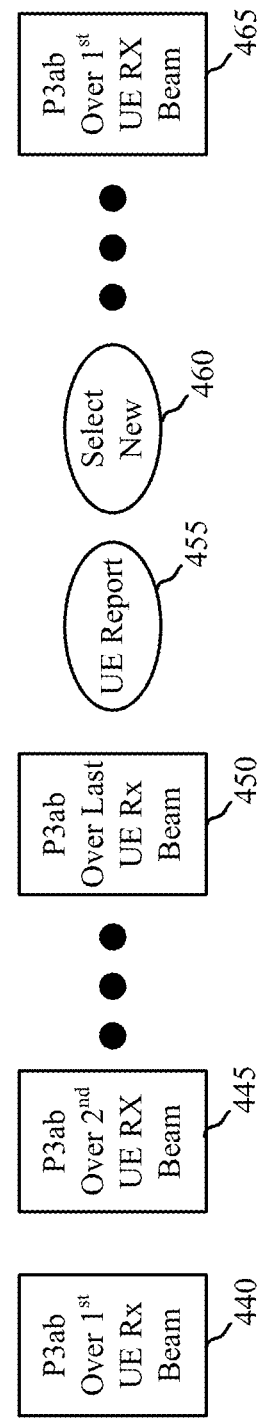

FIGS. 4A and 4B illustrate examples of a beam management configuration 400 that supports joint transmit and receive beam-sweeping for sidelink in accordance with aspects of the present disclosure. In some examples, beam management configuration 400 may implement aspects of wireless communication systems 100 and/or 200. Aspects of beam management configuration 400 may be implemented by a serving UE and/or a served UE, which may be examples of corresponding devices described herein. In some aspects, the serving UE and the served UE may be performing wireless communications over a sidelink channel, with the serving UE acting as the scheduling entity for the sidelink communications. Generally, beam management configuration 400-a illustrates a first pattern of transmission beam resources used for beam management, with beam management configuration 400-b illustrating a second pattern of transmission beam resources used for beam management.

As discussed herein, aspects of the described techniques provide for the serving UE to transmit or otherwise convey a first configuration signal (e.g., RRC configuration/reconfiguration signal) configuring the served UE with the first transmission beam resources and the second transmission beam resources of the serving UE. The served UE may use the first and second transmission beam resources for beam management over the sidelink channel. In the example illustrated in beam management configuration 400, the first transmission beam resources correspond to a first CSI-RS resource set transmitted from the serving UE using P2 beams and the second transmission beam resources correspond to a second CSI-RS resource set transmitted from the serving UE using a P3 beam. The served UE may determine or otherwise identify a pattern for performing beam management using the first transmission beam resources and the second transmission beam resources. The served UE may perform the beam management according to the pattern and based, at least in some aspects, on the first transmission beam resources and the second transmission beam resources.

In particular, beam management configuration 400 illustrates an example where the first transmission beam resources configured by the first configuration signal correspond to a CSI-RS resource set transmitted over a first P3 beam (e.g., P3a) and the second transmission beam resources configured by the first configuration signal correspond to a CSI-RS resource set transmitted over a second P3 beam (e.g., P3b). Accordingly, each P3 beam may cover the respective cluster directions between the serving UE and the served UE, with P3a corresponding to a transmit beam in the direction of a first cluster and P3b corresponding to a transmit beam in the direction of a second cluster. Broadly, the served UE may sweep the same set of narrow beams (e.g., each receive beam) for P3a and P3b.

Referring first to beam management configuration 400-a, this may include the serving UE transmitting a first CSI-RS transmission 405 over the P3a beam, for each served UE receive beam, in the first CSI-RS resource set (e.g., the first transmission beam resources). Concurrently or consecutively, the serving UE may transmit a second CSI-RS transmission 410 over the P3b beam, with the served UE sweeping its receive beams, in the second CSI-RS resource set (e.g., the second transmission beam resources). The served UE may transmit a feedback message 415 based on the CSI-RS transmissions over the P3a and/or P3b beams. This process may repeat again by the serving UE transmitting the a CSI-RS transmission 420 over the P3a beam, for each served UE receive beam, in the first CSI-RS resource set (e.g., the first transmission beam resources). Concurrently or consecutively, the serving UE may transmit a second CSI-RS transmission 425 over the P3b beam, with the served UE sweeping its receive beams, in the second CSI-RS resource set (e.g., the second transmission beam resources). The served UE may transmit another feedback message 430 based on the CSI-RS transmissions over the P3a and/or P3b beams.

The serving UE may identify or otherwise select new or updated transmission beam resources (e.g., a third transmission beam resources) based on one or more of the feedback messages received from the served UE. That is, each feedback message may identify a candidate P3 beam for the serving UE to use and/or may identify a result of the served UE monitoring the CSI-RS transmissions using the P3a and/or P3b beams (e.g., may indicate the RSRP values). Accordingly, the serving UE may transmit a second configuration signal (e.g., RRC configuration/reconfiguration signal) identifying a new transmission beam resource (e.g., updated CSI-RS resource set using the P3a and/or P3b beam 435).

Thus, beam management configuration 400-a illustrates an example pattern (aa . . . abb . . . baa . . . abb . . . b . . . ) where the serving UE transmits the CSI-RS transmission over the P3a beam for each served UE receive beam, and then transmits the CSI RS transmission over each P3b beam for each served UE receive beam.

Referring next to beam management configuration 400-b, this may include the serving UE transmitting a first CSI-RS transmission over the P3a beam and a second CSI-RS transmission over the P3b beam 440, for a first receive beam of the served UE, in the first CSI-RS resource set (e.g., the first transmission beam resources) and the second CSI-RS resource set (e.g., the second transmission beam resources), respectively. This process may continue with serving UE transmitting a first CSI-RS transmission over the P3a beam and transmitting a second CSI-RS transmission over the P3b beam 445, for a second receive beam of the served UE, in the first CSI-RS resource set (e.g., the first transmission beam resources) and the second CSI-RS resource set (e.g., the second transmission beam resources), respectively. This process may repeat for each served UE receive beam with the serving UE transmitting a first CSI-RS transmission over the P3a beam and transmitting a second CSI-RS transmission over the P3b beam 450, for a second receive beam of the served UE, in the first CSI-RS resource set (e.g., the first transmission beam resources) and the second CSI-RS resource set (e.g., the second transmission beam resources), respectively.

The served UE may transmit a feedback message 455 based on the CSI-RS transmissions over the P3a and/or P3b beams.

The serving UE may identify or otherwise select new or updated transmission beam resources (e.g., a third transmission beam resources) based on one or more of the feedback messages received from the served UE. That is, each feedback message may identify a candidate P3 beam for the serving UE to use and/or may simply identify a result of the served UE monitoring the CSI-RS transmissions using the P3a and/or P3b beams (e.g., may simply indicate the RSRP values). Accordingly, the serving UE may transmit a second configuration signal (e.g., RRC configuration/reconfiguration signal) identifying a new transmission beam resource (e.g., updated CSI-RS resource set using the P3a and/or P3b beam). This beam management process may be repeated by the serving UE transmitting a first CSI-RS transmission over the P3a beam and transmitting a second CSI-RS transmission over the P3b beam 465, for a second receive beam of the served UE, in the first CSI-RS resource set (e.g., the first transmission beam resources) and the second CSI-RS resource set (e.g., the second transmission beam resources), respectively Thus, beam management configuration 400-b illustrates an example pattern (ababab . . . ) where the serving UE transmits the CSI-RS transmission over the P3a beam and P3b beam for each served UE receive beam.

In some aspects, the served UE reported overhead may be reduced. For example, the served UE may not transmit feedback messages for every instance illustrated in beam management configuration 400. To reduce overhead, the served UE may choose to report (e.g., send feedback messages) based on a certain time period (e.g., periodically), which can cover more than one P3a/P3b procedure (e.g., depending on the CSI-RS resources) configuration for the serving UE beam P3a and P3b.

Figure 5:
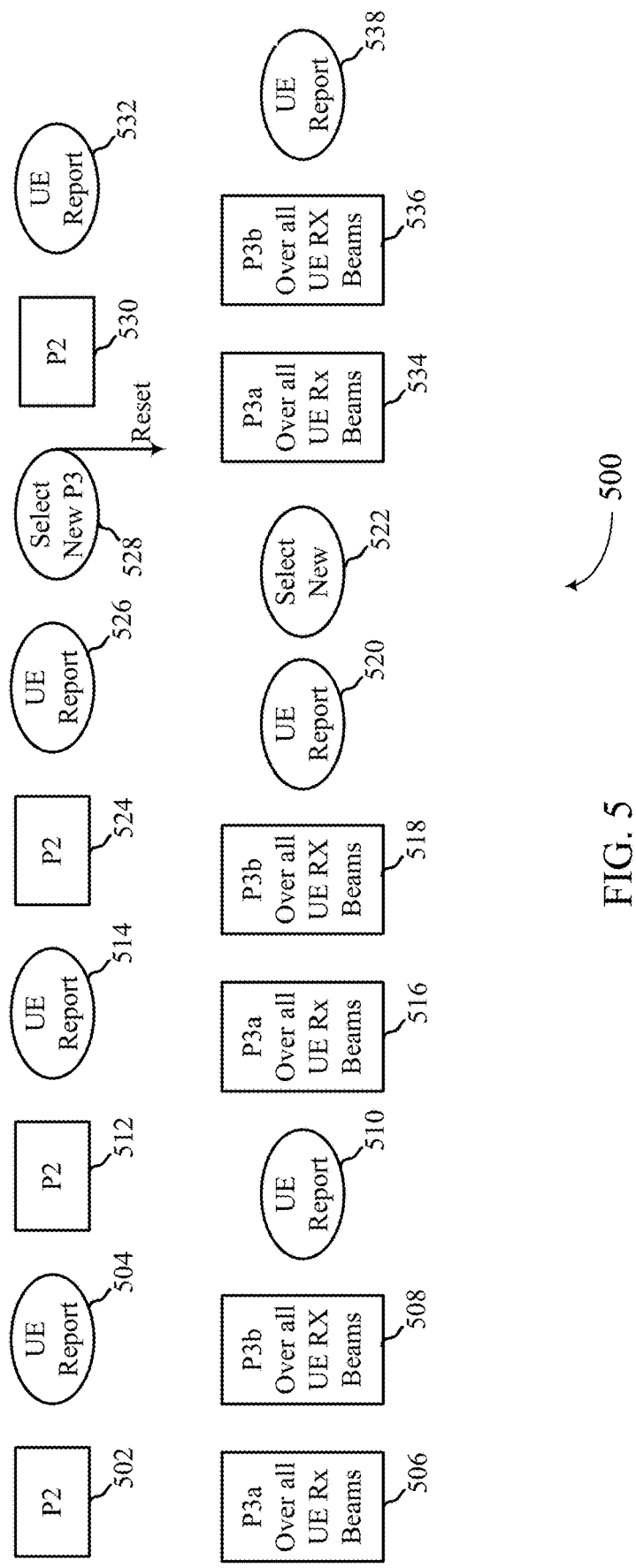
FIG. 5 illustrates an example of a beam management configuration that supports joint transmit and receive beam-sweeping for sidelink in accordance with aspects of the present disclosure.

FIG. 5 illustrates an example of a beam management configuration 500 that supports joint transmit and receive beam-sweeping for sidelink in accordance with aspects of the present disclosure. In some examples, beam management configuration 500 may implement aspects of wireless communication systems 100 and/or 200. Aspects of beam management configuration 500 may be implemented by a serving UE and/or a served UE, which may be examples of corresponding devices described herein. In some aspects, the serving UE and the served UE may be performing wireless communications over a sidelink channel, with the serving UE acting as the scheduling entity for the sidelink communications.

As discussed herein, aspects of the described techniques provide for the serving UE to transmit or otherwise convey a first configuration signal (e.g., RRC configuration/reconfiguration signal) configuring the served UE with the first transmission beam resources and the second transmission beam resources of the serving UE. The served UE may use the first and second transmission beam resources for beam management over the sidelink channel. In the example illustrated in beam management configuration 500, the first transmission beam resources correspond to a first CSI-RS resource set transmitted from the serving UE using P2 beams and the second transmission beam resources correspond to a second CSI-RS resource set transmitted from the serving UE using a P3 beam. The served UE may determine or otherwise identify a pattern for performing beam management using the first transmission beam resources and the second transmission beam resources. The served UE may perform the beam management according to the pattern and, in some aspects, based on the first transmission beam resources and the second transmission beam resources.

Generally, aspects of the described techniques may include the first transmission beam resources corresponding to M CSI-RS resource sets for P2 beam and the second transmission beam resources corresponding to N CSI-RS resource sets for the P3 beam. In the example illustrated in beam management configuration 500, the first transmission beam resources correspond to the a first set of CSI-RS resource set using P2 beam and the second transmission beam resources correspond to a second set of CSI-RS resources, with the second CSI-RS resource set including a first subset of CSI-RS resources using P3a beam and a second subset of CSI-RS resources using P3b beam.

Accordingly, this may include the serving UE sweeping CSI-RS transmissions over each P2 beam 502, for each served UE receive beam, in the first CSI-RS resource set (e.g., the first transmission beam resources). The served UE may transmit a feedback message 504 based at least in part on the CSI-RS transmissions over the P2 beam.

Concurrently or consecutively, the serving UE may transmit CSI-RS over the P3a beam 506, with the served UE sweeping its receive beams in the second CSI-RS resource set (e.g., the second transmission beam resources). Concurrently or consecutively, the serving UE may transmit CSI-RS over the P3b beam 508, with the served UE sweeping its receive beams in the second CSI-RS resource set (e.g., the second transmission beam resources). The served UE may transmit a feedback message 510 based at least in part on the CSI-RS transmissions over the P3a/P3b beams.

This process may continue with the serving UE sweeping CSI-RS transmissions over each P2 beam 512, for each served UE receive beam, in the first CSI-RS resource set (e.g., the first transmission beam resources). The served UE may transmit a feedback message 514 based at least in part on the CSI-RS transmissions over the P2 beam.

Concurrently or consecutively, the serving UE may transmit CSI-RS over the P3a beam 516, with the served UE sweeping its receive beams in the second CSI-RS resource set (e.g., the second transmission beam resources). Concurrently or consecutively, the serving UE may transmit CSI-RS over the P3b beam 518, with the served UE sweeping its receive beams in the second CSI-RS resource set (e.g., the second transmission beam resources). The served UE may transmit a feedback message 520 based at least in part on the CSI-RS transmissions over the P3a/P3b beams. Based on at least one of the feedback message, the serving UE may configure the served UE with a new or updated transmission beam resource 522 (e.g., a third transmission beam resources). For example, the new or updated transmission beam resources may identify a new CSI-RS resource set using a new or updated P2 beam, the P3a beam, and/or the P3b beam.

This process may again continue with the serving UE sweeping CSI-RS transmissions over each P2 beam 524, for each served UE receive beam, in the first CSI-RS resource set (e.g., the first transmission beam resources). The served UE may transmit a feedback message 526 based at least in part on the CSI-RS transmissions over the P2 beam. Based on at least one of the feedback messages, the serving UE may configure the served UE with a new or updated transmission beam resource 528 (e.g., a third or fourth transmission beam resources). For example, the new or updated transmission beam resources may identify a new CSI-RS resource set using a new or updated P2 beam, the P3a beam, and/or the P3b beam.

Concurrently or consecutively, the serving UE may transmit CSI-RS over the P3a beam 534, with the served UE sweeping its receive beams in the second CSI-RS resource set (e.g., the second transmission beam resources). Concurrently or consecutively, the serving UE may transmit CSI-RS over the P3b beam 536, with the served UE sweeping its receive beams in the second CSI-RS resource set (e.g., the second transmission beam resources). The served UE may transmit a feedback message 538 based at least in part on the CSI-RS transmissions over the P3a/P3b beams.

This process may continue further with the serving UE sweeping CSI-RS transmissions over each P2 beam 530, for each served UE receive beam, in the first CSI-RS resource set (e.g., the first transmission beam resources). The served UE may transmit a feedback message 532 based at least in part on the CSI-RS transmissions over the P2 beam.

Accordingly, the served UE may use a first receive beam to monitor for reference signal transmissions (e.g., CSI-RS transmissions using the P2 beams) from the serving UE and sweep a set of receive beams to monitor for one or more instances of a second reference signal transmission (e.g., CSI-RS transmissions using the P3a and/or P3b beams).

Figure 6:
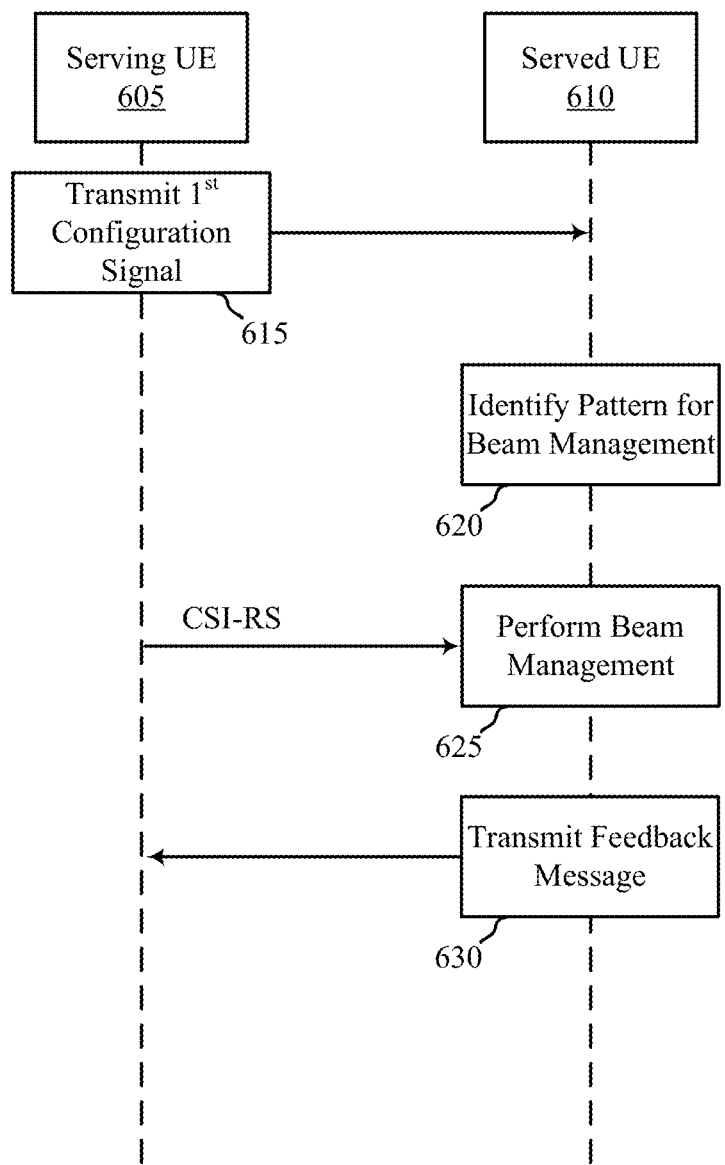
FIG. 6 illustrates an example of a process that supports joint transmit and receive beam-sweeping for sidelink in accordance with aspects of the present disclosure.

FIG. 6 illustrates an example of a process 600 that supports joint transmit and receive beam-sweeping for sidelink in accordance with aspects of the present disclosure. In some examples, process 600 may implement aspects of wireless communication systems 100, and/or 200 and/or beam management configurations 300, and/or 400. Aspects of process 600 may be implemented by serving UE 605 and served UE 610, which may be examples of corresponding devices described herein. In some aspects, serving UE 605 and served UE 610 may be performing wireless communications over a sidelink channel. In some aspects, serving UE 605 acts as a scheduling entity for served UE 610 with respect to the wireless communications over the sidelink channel.

It is to be understood that references to specific wireless devices (e.g., UEs) in the process 600 are provided for illustrative purposes, and different wireless devices not specifically referred to herein may be used interchangeably with those described herein. For example, the described operations performed by a serving UE 605 may, in some cases, be performed by a base station, a controlling UE, a master UE, an anchor UE, or any sidelink scheduling node. Further, while the operations performed in process 600 are described using sidelink communications, it is to be understood that the techniques described herein may be used for any type of wireless communications (e.g., over any type of wireless links).

At 615, serving UE 605 may transmit (and served UE 610 may receive) a first configuration signal over a channel (e.g., a sidelink channel, a downlink channel, etc.) that configures the served UE 610 with first transmission beam resources and second transmission beam resources of the serving UE 605. The configuration signal may include an RRC signal, a DCI signal, a MAC control element (CE), and the like. In some examples, a base station may configure the serving UE 605, which may in turn configure the served UE 610. In some other examples, served UE 610 may receive the first configuration signal from a base station (e.g., and not a serving UE 605), for example, over a downlink channel, and may receive one or more sidelink reference signals from the serving UE 605.

In some aspects, the first transmission beam resources may correspond to a first CSI-RS resource set and the second transmission beam resources may correspond to a second CSI-RS resource set. In some aspects, the first transmission beam resources may correspond to a first subset of a CSI-RS resource set and the second transmission beam resources may correspond to a second subset of the CSI-RS resource set. Generally, the first transmission beam resources may correspond to M CSI-RS resource set(s) and the second transmission beam resources may correspond to N CSI-RS resource set(s), where M and N may be integers that are the same or may be different. In some examples, the first transmission beam resources may include first repeated transmissions using a same first antenna port, the second transmission beam resources may include second repeated transmissions using a same second antenna port, or both.

At 620, the served UE 610 may identify, based on the first configuration signal, a pattern for performing beam management over a sidelink channel using the first transmission beam resources and the second transmission beam resources. The pattern may be based on a repetition flag for the first and/or second transmission beam resources configured by the first configuration signal.

At 625, the served UE 610 may perform beam management over the sidelink channel in accordance with the pattern and using the first transmission beam resources and the second transmission beam resources. For example, serving UE 605 may transmit CSI-RS(s) over the sidelink channel according to the first transmission beam resources and the second transmission beam resources.

In some aspects, this may include served UE 610 using a first receive beam to monitor for reference signal transmissions (e.g., CSI-RS transmissions over the P2 beam) according to the first transmission beam resources and using a set of receive beams to monitor for a reference signal transmission (e.g., a CSI-RS transmission over the P3 beam) according to the second transmission beam resources. In some cases, served UE 610 may monitor for a first reference signal transmission (e.g., from serving UE 615) based on the first transmission beam resources including first repeated transmissions using the same first antenna port. Additionally, or alternatively, served UE 610 may monitor for a second reference signal transmission (e.g., from serving UE 615) based on the second transmission beam resources including second repeated transmissions using the same second antenna port.

In some aspects, this may include the served UE 610 sweeping a set of receive beams to monitor for a first reference signal transmission (e.g., from serving UE 615) according to the first transmission beam resources (e.g., sweeping each receive beam of served UE 610 to detect a CSI-RS transmission over a P3a beam) and sweeping the set of receive beams to monitor for a second reference signal transmission (e.g., from serving UE 615) according to the second transmission beam resources (e.g., sweeping each receive beam of served UE 610 to detect a CSI-RS transmission over a P3b beam).

In some aspects, this may include the served UE 610 using a first receive beam to monitor for reference signal transmissions (e.g., CSI-RS transmissions over the P2 beam) according to the first transmission beam resources and sweeping a set of receive beams to monitor for multiple instances of a second reference signal transmission (e.g., CSI-RS transmissions over P3a and P3B beams) according to the second transmission beam resources. In some examples, served UE 610 may perform beam sweeping over the repeated transmissions included in the first transmission beam resources and/or perform beam sweeping over the repeated transmissions included in the second transmission beam resources. In some cases, served UE 610 may perform the monitoring using the first receive beam for reference signal transmissions according to the first transmission beam resources concurrently, consecutively, or using time-division multiplexing with the monitoring for the reference signal transmission performed by sweeping the set of receive beams of the served UE 610. In some other cases, served UE 610 may perform the monitoring for the first reference signal transmission by sweeping a set of receive beams for the served UE 610 concurrently, consecutively, or using time-division multiplexing with the monitoring for the second reference signal transmission by sweeping the set of receive beams.

At 630, served UE 610 may transmit a feedback message. In some examples, the served UE 610 may transmit the feedback message to the serving UE 605. In some other examples, the served UE 610 may transmit the feedback message to a base station, controlling sidelink UE, or other sidelink scheduling node, for instance, if the served UE 610 was configured by the base station, controlling sidelink UE, or other sidelink scheduling node. In still other examples, the served UE 610 may transmit the feedback message to a base station, and the base station may transmit the feedback message to the serving UE 605. Additionally, or alternatively, the base station may instruct the serving UE 605 based on the feedback message.

In some aspects, the feedback message may be based on the CSI-RS transmissions from the serving UE 605 using the first transmission beam resources and the second transmission beam resources. That is, the feedback message may be transmitted in response to the served UE 610 monitoring one or more of the CSI-RS transmissions discussed above over the first and/or second transmission beam resources. In some aspects, the feedback message may identify a result of the served UE 610 monitoring (e.g., RSRP) and/or may identify candidate beams that the served UE 610 has identified as suitable for performing wireless communications over the channel (e.g., sidelink channel or downlink channel), for example, candidate beams that can be selected as the active beams for such communications.

In some aspects, serving UE 605 (e.g., or base station) may identify an updated or new beam to use for communications over the channel (e.g., a third transmission beam resources) and configure the served UE 610 with the new transmit beam. For example, serving UE 605 (e.g., or base station) may transmit a second configuration signal (e.g., RRC signal, a DCI, etc.) identifying the third transmission beam resources to be used for the wireless communications over the channel.

Figure 7:
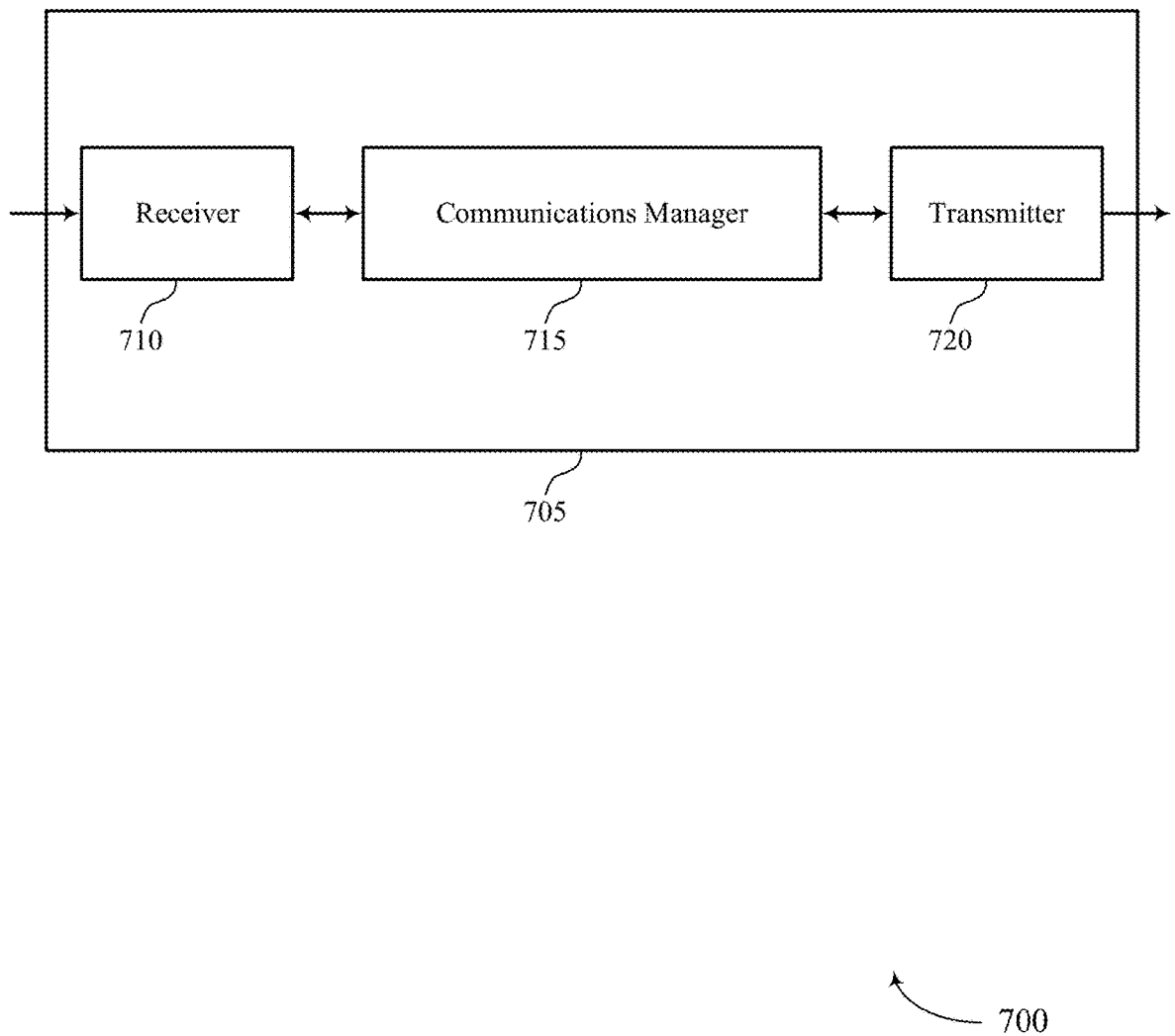
FIGS. 7 and 8 show block diagrams of devices that support joint transmit and receive beam-sweeping for sidelink in accordance with aspects of the present disclosure.

FIG. 7 shows a block diagram 700 of a device 705 that supports joint transmit and receive beam-sweeping for sidelink in accordance with aspects of the present disclosure. The device 705 may be an example of aspects of a UE 115 or a base station 105 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to joint transmit and receive beam-sweeping for sidelink, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may, when device 705 is configured as a served UE, receive, from a wireless device (e.g., a serving UE, a base station, etc.) and over a channel (e.g., a sidelink channel, a downlink channel), a first configuration signal configuring the served UE with first transmission beam resources and second transmission beam resources for the served UE to use for beam management over a sidelink channel, identify, based on the first configuration signal, a pattern for performing beam management using the first transmission beam resources and the second transmission beam resources, and perform the beam management over the sidelink channel in accordance with the pattern using the first transmission beam resources and the second transmission beam resources.

The communications manager 715 may, when device 705 is configured as a serving wireless device (e.g., a serving UE, a base station, etc.), also transmit (e.g., to a served UE and over a channel, such as a sidelink channel or a downlink channel), a first configuration signal configuring the served UE with first transmission beam resources and second transmission beam resources for the served UE to use for beam management over a sidelink channel, transmit one or more first reference signals using the first transmission beam resources and one or more second reference signals using the second transmission beam resources, and receive a feedback message (e.g., from the served UE) based on the transmissions of the one or more first reference signals, the one or more second reference signals, or both. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

By including or configuring the communications manager 720 in accordance with examples as described herein, the device 705 (e.g., a processor controlling or otherwise coupled to the receiver 710, the transmitter 715, the communications manager 720, or a combination thereof) may support improved beam management techniques for sidelink communications. For example, by enabling a served UE to determine an appropriate beam management pattern, the served UE may avoid performing an iterative beam management process with a serving UE or a base station, and may more efficiently determine a best available transmit beam and a best available receive beam. Determining best beams may provide the served UE and the serving UE or base station with more reliable and robust communications, thereby reducing network overhead and improving efficiency. Further, enabling joint beam-sweeping procedures as described herein may reduce how often a processor of a UE must ramp up to handle signal transmission or retransmission and reception, thereby reducing processing resources at the UE, reducing power consumption, and improving battery performance.

Figure 8:
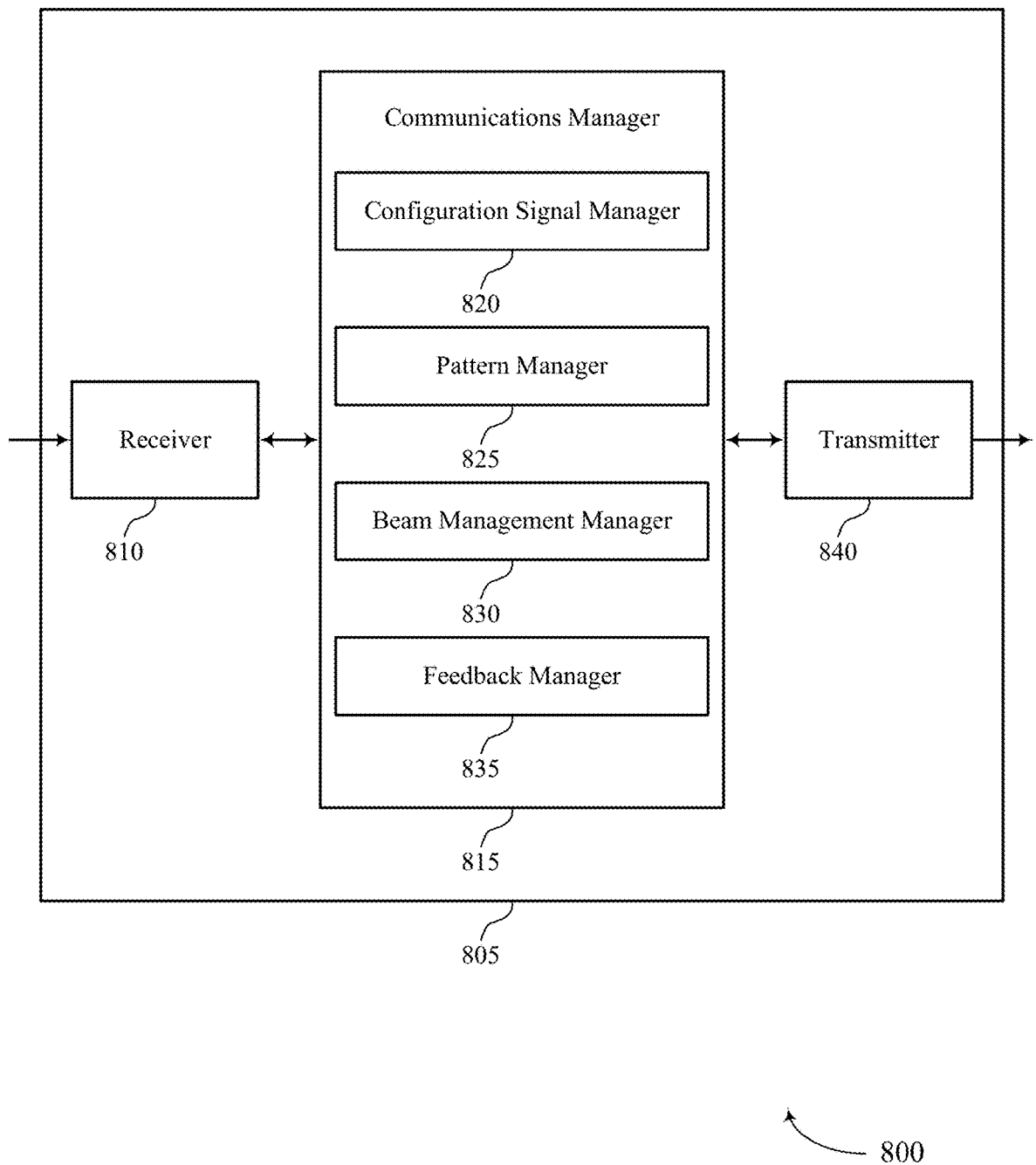

FIG. 8 shows a block diagram 800 of a device 805 that supports joint transmit and receive beam-sweeping for sidelink in accordance with aspects of the present disclosure.

The device 805 may be an example of aspects of a device 705, a base station 105, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to joint transmit and receive beam-sweeping for sidelink, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a configuration signal manager 820, a pattern manager 825, a beam management manager 830, and a feedback manager 835. The communications manager 815 may be an example of aspects of the communications manager 1010 described herein.

The configuration signal manager 820 may receive (e.g., from a serving UE, from a base station, over a sidelink channel, over a downlink channel, etc.) a first configuration signal configuring a served UE with first transmission beam resources and second transmission beam resources for the served UE to use for beam management over a sidelink channel.

The pattern manager 825 may identify, based on the first configuration signal, a pattern for performing beam management using the first transmission beam resources and the second transmission beam resources.

The beam management manager 830 may perform the beam management over the sidelink channel in accordance with the pattern using the first transmission beam resources and the second transmission beam resources.

The configuration signal manager 820 may transmit a first configuration signal configuring the served UE with first transmission beam resources and second transmission beam resources for the served UE to use for beam management over the sidelink channel.

The beam management manager 830 may transmit one or more first reference signals using the first transmission beam resources and one or more second reference signals using the second transmission beam resources.

The feedback manager 835 may receive a feedback message based on the transmissions of the one or more first reference signals, the one or more second reference signals, or both.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
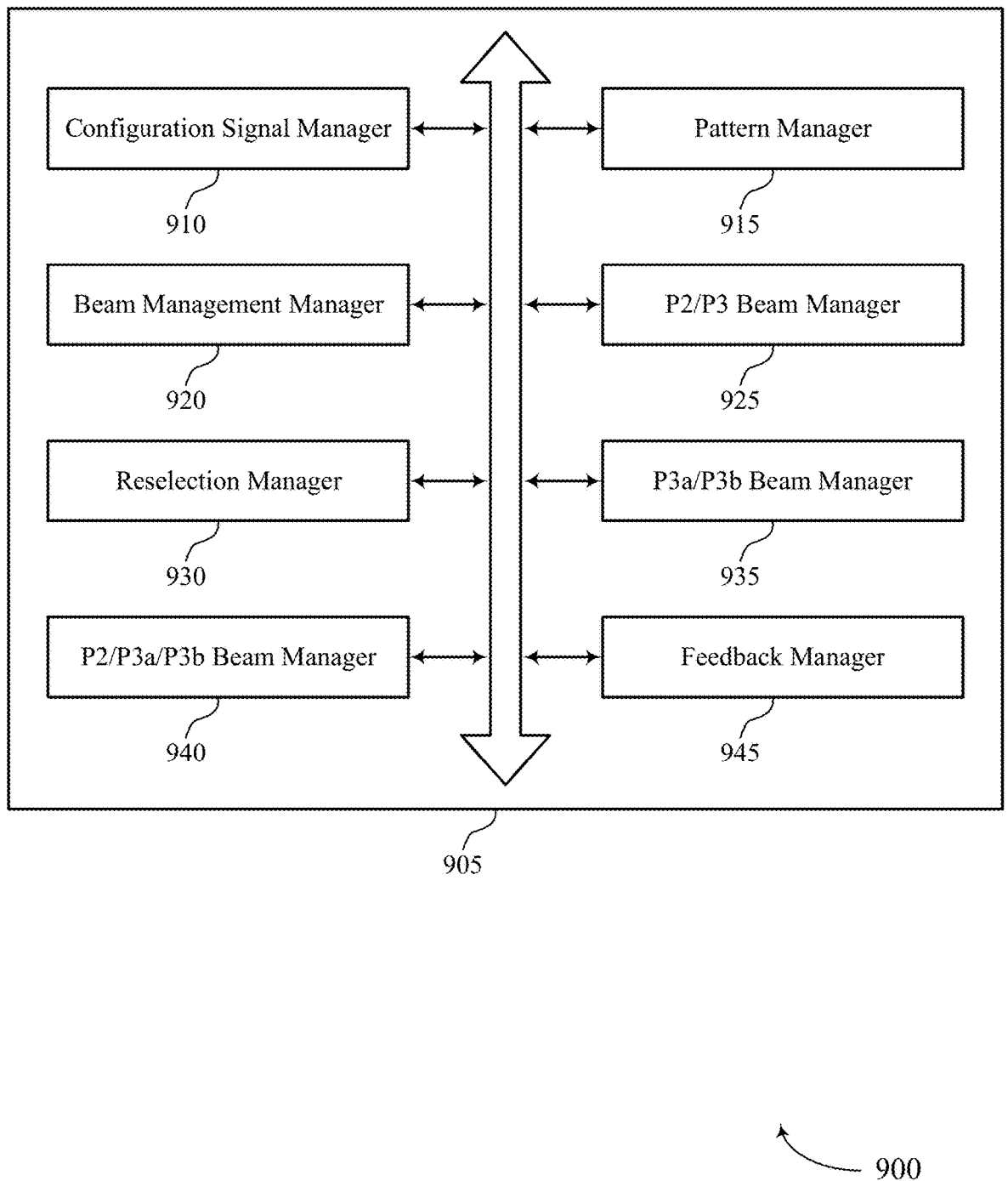
FIG. 9 shows a block diagram of a communications manager that supports joint transmit and receive beam-sweeping for sidelink in accordance with aspects of the present disclosure.

FIG. 9 shows a block diagram 900 of a communications manager 905 that supports joint transmit and receive beam-sweeping for sidelink in accordance with aspects of the present disclosure. The communications manager 905 may be an example of aspects of a communications manager 715, a communications manager 815, or a communications manager 1010 described herein. The communications manager 905 may include a configuration signal manager 910, a pattern manager 915, a beam management manager 920, a P2/P3 beam manager 925, a reselection manager 930, a p3a/P3b beam manager 935, a p2/P3a/P3b beam manager 940, and a feedback manager 945. Each of these modules may communicate, directly or indirectly, with one another (e.g., via one or more buses).

The configuration signal manager 910 may receive (e.g., from a serving UE, a base station, etc.) a first configuration signal configuring the served UE with first transmission beam resources and second transmission beam resources (e.g., of the serving UE) for the served UE to use for beam management over a sidelink channel.

In some examples, the configuration signal manager 910 may transmit (e.g., to a served UE and over a sidelink channel), a first configuration signal configuring the served UE with first transmission beam resources and second transmission beam resources (e.g., of the serving UE) for the served UE to use for beam management over the sidelink channel.

In some cases, the first configuration signal configures the first transmission beam resources as a first set of reference signal resources and a second set of reference signal resources, and configures the second transmission beam resources as a third set of reference signal resources, with the second set of reference signal resources and the third set of reference signal resources being configured with repetition enabled for the beam management. In some cases, the first transmission beam resources include a first CSI-RS resource set and the second transmission beam resources include a second CSI-RS resource set. In some cases, the first transmission beam resources include a first subset of a CSI-RS resource set and the second transmission beam resources include a second subset of the CSI-RS resource set. In some cases, the first transmission beam resources include a first CSI-RS resource set and the second transmission beam resources include a second CSI-RS resource set. In some cases, the first transmission beam resources include a first subset of a CSI-RS resource set and the second transmission beam resources include a second subset of the CSI-RS resource set. In some examples, the second transmission beam resources include repeated transmissions using a same antenna port.

The pattern manager 915 may identify, based on the first configuration signal, a pattern for performing beam management using the first transmission beam resources and the second transmission beam resources.

The beam management manager 920 may perform the beam management over the sidelink channel in accordance with the pattern using the first transmission beam resources and the second transmission beam resources.

In some examples, the beam management manager 920 may transmit one or more first reference signals using the first transmission beam resources and one or more second reference signals using the second transmission beam resources. In some cases, the transmissions of the one or more first reference signals and the one or more second reference signals are performed concurrently, consecutively, or using time-division multiplexing. In some cases, the transmissions of the one or more first reference signals and the one or more second reference signals are performed between successive symbols, or successive mini-slots, or successive slots, or successive subframes, or a combination thereof.

The feedback manager 945 may receive a feedback message (e.g., from the served UE) based on the transmissions of the one or more first reference signals, the one or more second reference signals, or both. In some examples, the feedback manager 945 may receive, based on the one or more first reference signals, a first feedback message. In some examples, the feedback manager 945 may receive, based on the one or more second reference signals, a second feedback message.

The P2/P3 beam manager 925 may monitor, using a first receive beam of the served UE, for reference signal transmissions (e.g., from the serving UE, from the base station, etc.) based on the first transmission beam resources. In some examples, the P2/P3 beam manager 925 may monitor, by sweeping a set of receive beams of the served UE, for a reference signal transmission (e.g., from the serving UE) based on the second transmission beam resources. In some examples, the P2/P3 beam manager 925 may monitor for a reference signal transmission based on the second transmission beam resources including repeated transmissions using the same antenna port. In some examples, the P2/P3 beam manager 925 may monitor using the first receive beam and monitoring by sweeping the set of receive beams concurrently, consecutively, or using time-division multiplexing.

In some examples, the P2/P3 beam manager 925 may alternate between monitoring using the first receive beam and monitoring by sweeping the set of receive beams between successive symbols, or successive mini-slots, or successive slots, or successive subframes, or a combination thereof. In some examples, the P2/P3 beam manager 925 may transmit a first feedback message identifying a result of the monitoring using the first receive beam. In some examples, the P2/P3 beam manager 925 may transmit a second feedback message identifying a result of the monitoring by sweeping the set of receive beams.

The reselection manager 930 may identify, based on monitoring using the first receive beam of the served UE, one or more transmit beam candidates from reference signal transmissions (e.g., from the serving UE, from the base station, etc.). In some examples, the reselection manager 930 may transmit a feedback message identifying the one or more transmit beam candidates. In some examples, the reselection manager 930 may reset the second transmission beam resources based on the feedback message. In some examples, the reselection manager 930 may select, based on the feedback message, at least one of a third transmission beam resources. In some examples, the reselection manager 930 may transmit a second configuration signal to the served UE identifying the third transmission beam resources as a replacement for the first transmission beam resources or the second transmission beam resources.

The P3a/P3b beam manager 935 may monitor, by sweeping a set of receive beams of the served UE, for a first reference signal transmission (e.g., from the serving UE) based on the first transmission beam resources (e.g., based on the first transmission beam resources including first repeated transmissions using a same first antenna port). In some examples, the P3a/P3b beam manager 935 may monitor, by sweeping the set of receive beams of the served UE, for a second reference signal transmission (e.g., from the serving UE) based on the second transmission beam resources (e.g., based on the second transmission beam resources including second repeated transmissions using a same second antenna port). In some examples, the P3a/P3b beam manager 935 may monitor for the first reference signal transmission and monitor for the second reference signal transmission concurrently, consecutively, or using time-division multiplexing. In some examples, the P3a/P3b beam manager 935 may alternate between monitoring for the first reference signal transmission and monitoring for the second reference signal transmission between successive symbols, or successive mini-slots, or successive slots, or successive subframes, or a combination thereof. In some examples, the P3a/P3b beam manager 935 may transmit a first feedback message identifying a result of the monitoring for the first reference signal transmission. In some examples, the P3a/P3b beam manager 935 may transmit a second feedback message identifying a result of the monitoring for the second reference signal transmission.

The P2/P3a/P3b beam manager 940 may monitor, using a first receive beam of the served UE, for reference signal transmissions (e.g., from the serving UE) based on the first transmission beam resources. In some examples, the P2/P3a/P3b beam manager 940 may monitor, by sweeping a set of receive beams of the served UE, for multiple instances of a second reference signal transmission (e.g., from the serving UE) based on the second transmission beam resources, e.g., based on the second transmission beam resources including repeated transmissions using the same antenna port. In some examples, the P2/P3a/P3b beam manager 940 may monitor for the reference signal transmissions and monitoring for the multiple instances of the second reference signal transmission concurrently, consecutively, or using time-division multiplexing. In some examples, the P2/P3a/P3b beam manager 940 may alternate between monitoring for the reference signal transmissions and monitoring for the multiple instances of the second reference signal transmission between successive symbols, or successive mini-slots, or successive slots, or successive subframes, or a combination thereof. In some examples, the P2/P3a/P3b beam manager 940 may transmit a first feedback message identifying a result of the monitoring for the reference signal transmissions. In some examples, the P2/P3a/P3b beam manager 940 may transmit a second feedback message identifying a result of the monitoring for the multiple instances of the second reference signal transmission. In some examples, the P2/P3a/P3b beam manager 940 may reset the second transmission beam resources based on at least one of the first feedback message, or the second feedback message, or a combination thereof.

In some cases, the first transmission beam resources correspond to a first set of reference signal resource sets. In some cases, the second transmission beam resources corresponding to a second set of reference signal resource sets.

Figure 10:
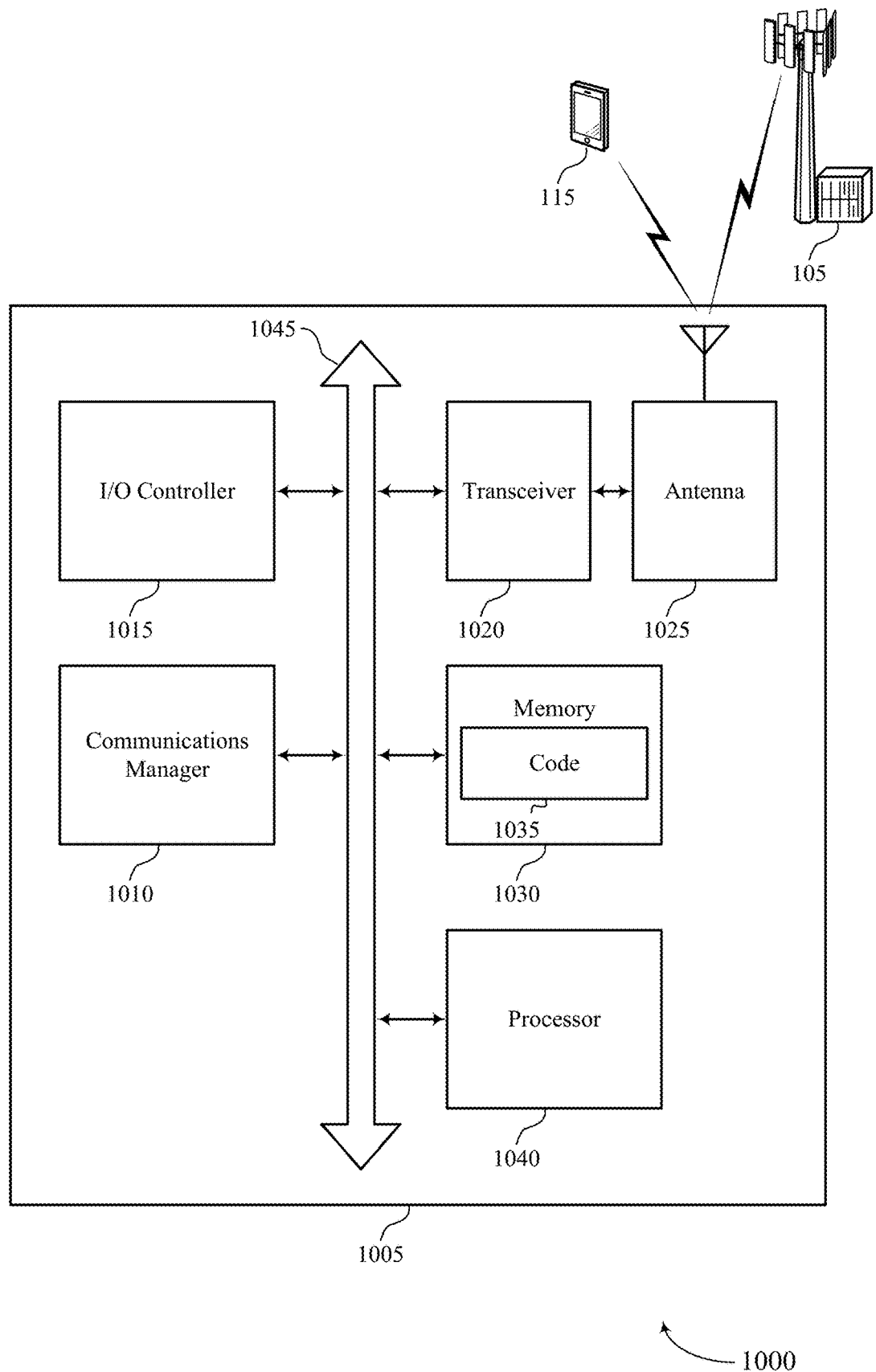
FIG. 10 shows a diagram of a system including a device that supports joint transmit and receive beam-sweeping for sidelink in accordance with aspects of the present disclosure.

FIG. 10 shows a diagram of a system 1000 including a device 1005 that supports joint transmit and receive beam-sweeping for sidelink in accordance with aspects of the present disclosure. The device 1005 may be an example of or include the components of device 705, device 805, a base station 105, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may, when device 1005 is configured as a served UE, receive (e.g., from a serving UE, from a base station, over a sidelink channel, over a downlink channel, etc.) a first configuration signal configuring the served UE with first transmission beam resources and second transmission beam resources (e.g., of the serving UE) for the served UE to use for beam management over a sidelink channel, identify, based on the first configuration signal, a pattern for performing beam management using the first transmission beam resources and the second transmission beam resources, and perform the beam management over the sidelink channel in accordance with the pattern using the first transmission beam resources and the second transmission beam resources.

The communications manager 1010 may, when device 1005 is configured as a serving UE (e.g., or a base station), also transmit (e.g., to a served UE, to a serving UE, over a sidelink channel, over a downlink channel, etc.) a first configuration signal configuring the served UE with first transmission beam resources and second transmission beam resources (e.g., of the serving UE) for the served UE to use for beam management over a sidelink channel, transmit one or more first reference signals using the first transmission beam resources and one or more second reference signals using the second transmission beam resources, and receive a feedback message (e.g., from the served UE, from a serving UE, etc.) based on the transmissions of the one or more first reference signals, the one or more second reference signals, or both.

By including or configuring the communications manager 1010 in accordance with examples as described herein, the device 1005 may support improved beam management techniques for sidelink communications. For example, by enabling the use of joint beam-sweeping in sidelink transmissions, a quantity of sidelink transmissions and retransmissions used for beam management may be reduced, thereby reducing network overhead, increasing coverage area, and improving efficiency. Moreover, by joint beam-sweeping in sidelink transmissions, aspects of the present disclosure provide for more reliable beam management at mobile UEs, thereby improving robustness and reliability in communications between mobile UEs.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting joint transmit and receive beam-sweeping for sidelink).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
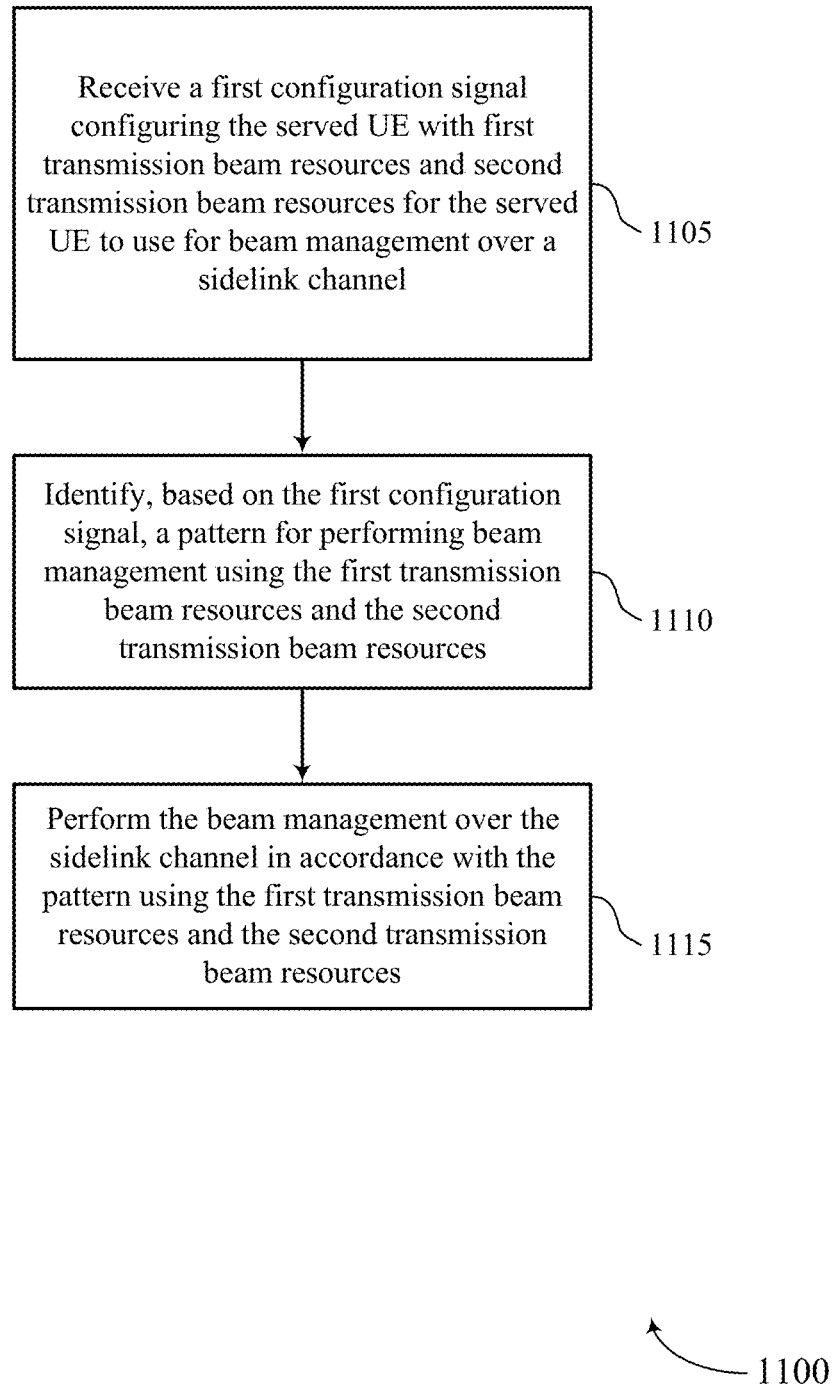
FIGS. 11 through 15 show flowcharts illustrating methods that support joint transmit and receive beam-sweeping for sidelink in accordance with aspects of the present disclosure.

FIG. 11 shows a flowchart illustrating a method 1100 that supports joint transmit and receive beam-sweeping for sidelink in accordance with aspects of the present disclosure. The operations of method 1100 may be implemented by a UE 115 or its components as described herein. For example, the operations of method 1100 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1105, the UE may receive (e.g., from a serving UE, from a base station, over a sidelink channel, over a downlink channel, etc.) a first configuration signal configuring the served UE with first transmission beam resources and second transmission beam resources (e.g., of the serving UE) for the served UE to use for beam management over a sidelink channel. The operations of 1105 may be performed according to the methods described herein. In some examples, aspects of the operations of 1105 may be performed by a configuration signal manager as described with reference to FIGS. 7 through 10.

At 1110, the UE may identify, based on the first configuration signal, a pattern for performing beam management using the first transmission beam resources and the second transmission beam resources. The operations of 1110 may be performed according to the methods described herein. In some examples, aspects of the operations of 1110 may be performed by a pattern manager as described with reference to FIGS. 7 through 10.

At 1115, the UE may perform the beam management over the sidelink channel in accordance with the pattern using the first transmission beam resources and the second transmission beam resources. The operations of 1115 may be performed according to the methods described herein. In some examples, aspects of the operations of 1115 may be performed by a beam management manager as described with reference to FIGS. 7 through 10.

Figure 12:
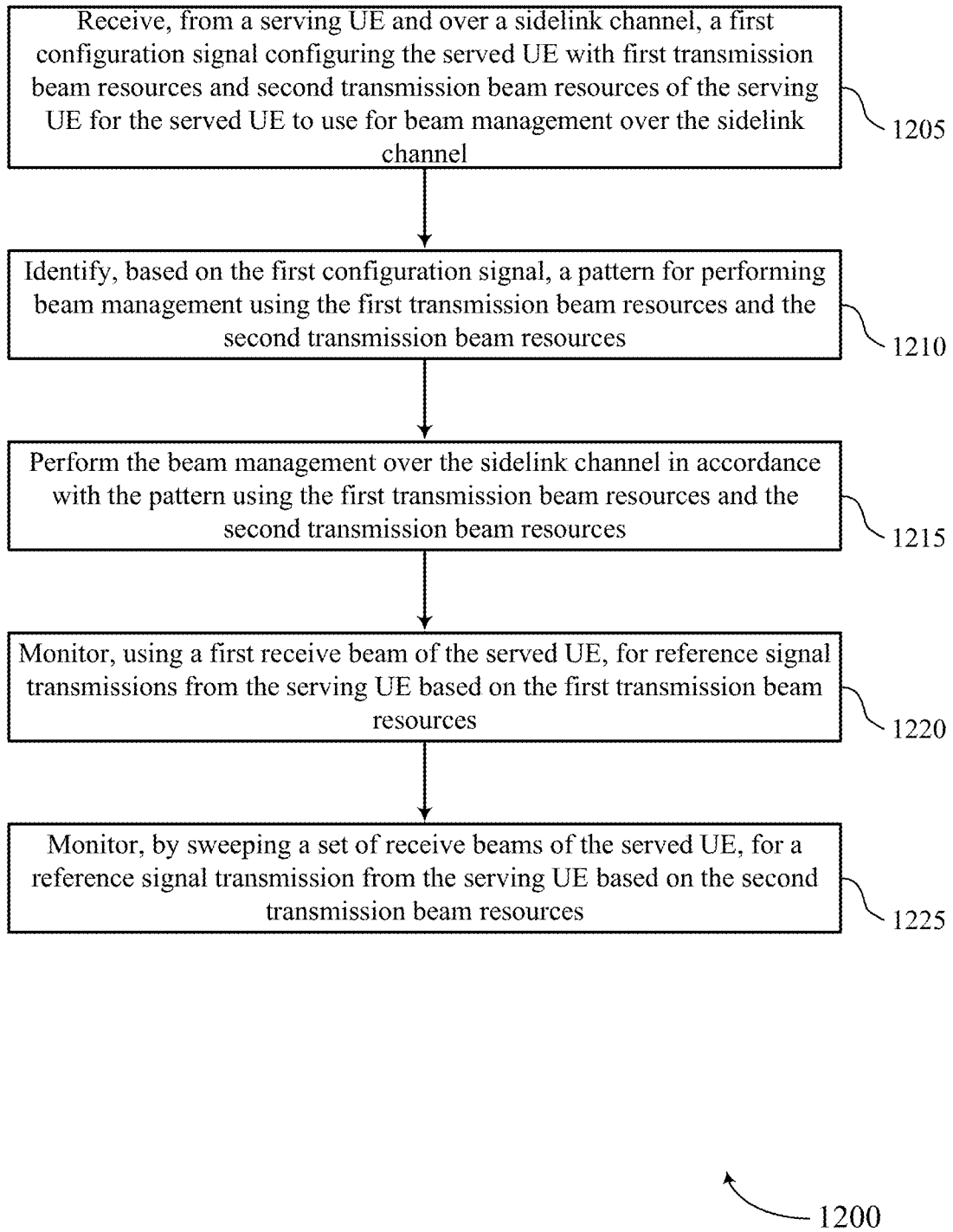

FIG. 12 shows a flowchart illustrating a method 1200 that supports joint transmit and receive beam-sweeping for sidelink in accordance with aspects of the present disclosure. The operations of method 1200 may be implemented by a UE 115 or its components or a base station 105 or its components as described herein. For example, the operations of method 1200 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1205, the UE may receive (e.g., from a serving UE, from a base station, over a sidelink channel, over a downlink channel, etc.) a first configuration signal configuring the served UE with first transmission beam resources and second transmission beam resources of the serving UE for the served UE to use for beam management over the sidelink channel. The operations of 1205 may be performed according to the methods described herein. In some examples, aspects of the operations of 1205 may be performed by a configuration signal manager as described with reference to FIGS. 7 through 10.

At 1210, the UE may identify, based on the first configuration signal, a pattern for performing beam management using the first transmission beam resources and the second transmission beam resources. The operations of 1210 may be performed according to the methods described herein. In some examples, aspects of the operations of 1210 may be performed by a pattern manager as described with reference to FIGS. 7 through 10.

At 1215, the UE may perform the beam management over the sidelink channel in accordance with the pattern using the first transmission beam resources and the second transmission beam resources. The operations of 1215 may be performed according to the methods described herein. In some examples, aspects of the operations of 1215 may be performed by a beam management manager as described with reference to FIGS. 7 through 10.

At 1220, the UE may monitor, using a first receive beam of the served UE, for reference signal transmissions from the serving UE based on the first transmission beam resources. The operations of 1220 may be performed according to the methods described herein. In some examples, aspects of the operations of 1220 may be performed by a P2/P3 beam manager as described with reference to FIGS. 7 through 10.

At 1225, the UE may monitor, by sweeping a set of receive beams of the served UE, for a reference signal transmission from the serving UE based on the second transmission beam resources. The operations of 1225 may be performed according to the methods described herein. In some examples, aspects of the operations of 1225 may be performed by a P2/P3 beam manager as described with reference to FIGS. 7 through 10.

Figure 13:
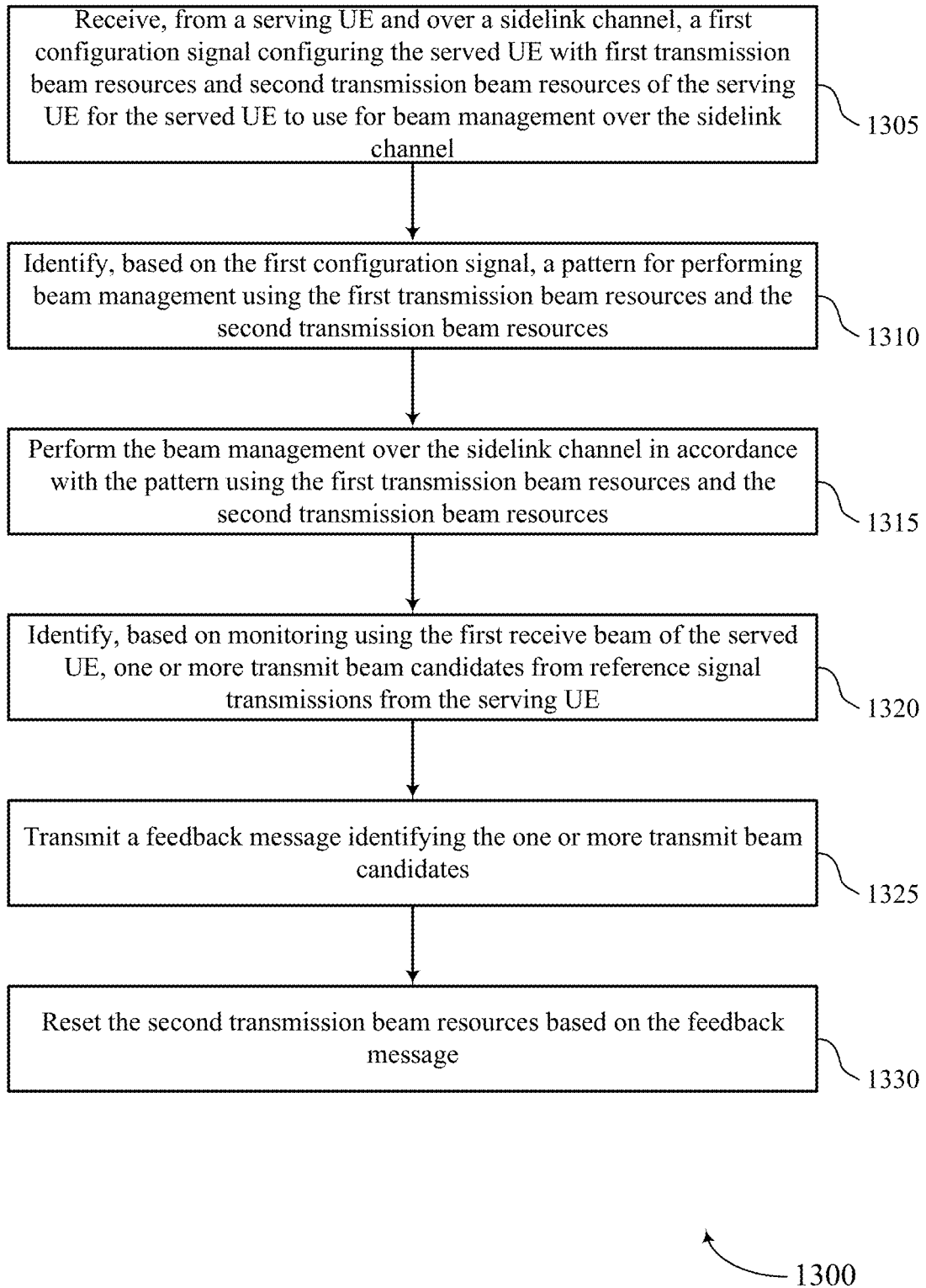

FIG. 13 shows a flowchart illustrating a method 1300 that supports joint transmit and receive beam-sweeping for sidelink in accordance with aspects of the present disclosure. The operations of method 1300 may be implemented by a UE 115 or its components as described herein. For example, the operations of method 1300 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1305, the UE may receive, from a serving UE and over a sidelink channel, a first configuration signal configuring the served UE with first transmission beam resources and second transmission beam resources of the serving UE for the served UE to use for beam management over the sidelink channel. The operations of 1305 may be performed according to the methods described herein. In some examples, aspects of the operations of 1305 may be performed by a configuration signal manager as described with reference to FIGS. 7 through 10.

At 1310, the UE may identify, based on the first configuration signal, a pattern for performing beam management using the first transmission beam resources and the second transmission beam resources. The operations of 1310 may be performed according to the methods described herein. In some examples, aspects of the operations of 1310 may be performed by a pattern manager as described with reference to FIGS. 7 through 10.

At 1315, the UE may perform the beam management over the sidelink channel in accordance with the pattern using the first transmission beam resources and the second transmission beam resources. The operations of 1315 may be performed according to the methods described herein. In some examples, aspects of the operations of 1315 may be performed by a beam management manager as described with reference to FIGS. 7 through 10.

At 1320, the UE may identify, based on monitoring using the first receive beam of the served UE, one or more transmit beam candidates from reference signal transmissions from the serving UE. The operations of 1320 may be performed according to the methods described herein. In some examples, aspects of the operations of 1320 may be performed by a reselection manager as described with reference to FIGS. 7 through 10.

At 1325, the UE may transmit a feedback message identifying the one or more transmit beam candidates. The operations of 1325 may be performed according to the methods described herein. In some examples, aspects of the operations of 1325 may be performed by a reselection manager as described with reference to FIGS. 7 through 10.

At 1330, the UE may reset the second transmission beam resources based on the feedback message. The operations of 1330 may be performed according to the methods described herein. In some examples, aspects of the operations of 1330 may be performed by a reselection manager as described with reference to FIGS. 7 through 10.

Figure 14:
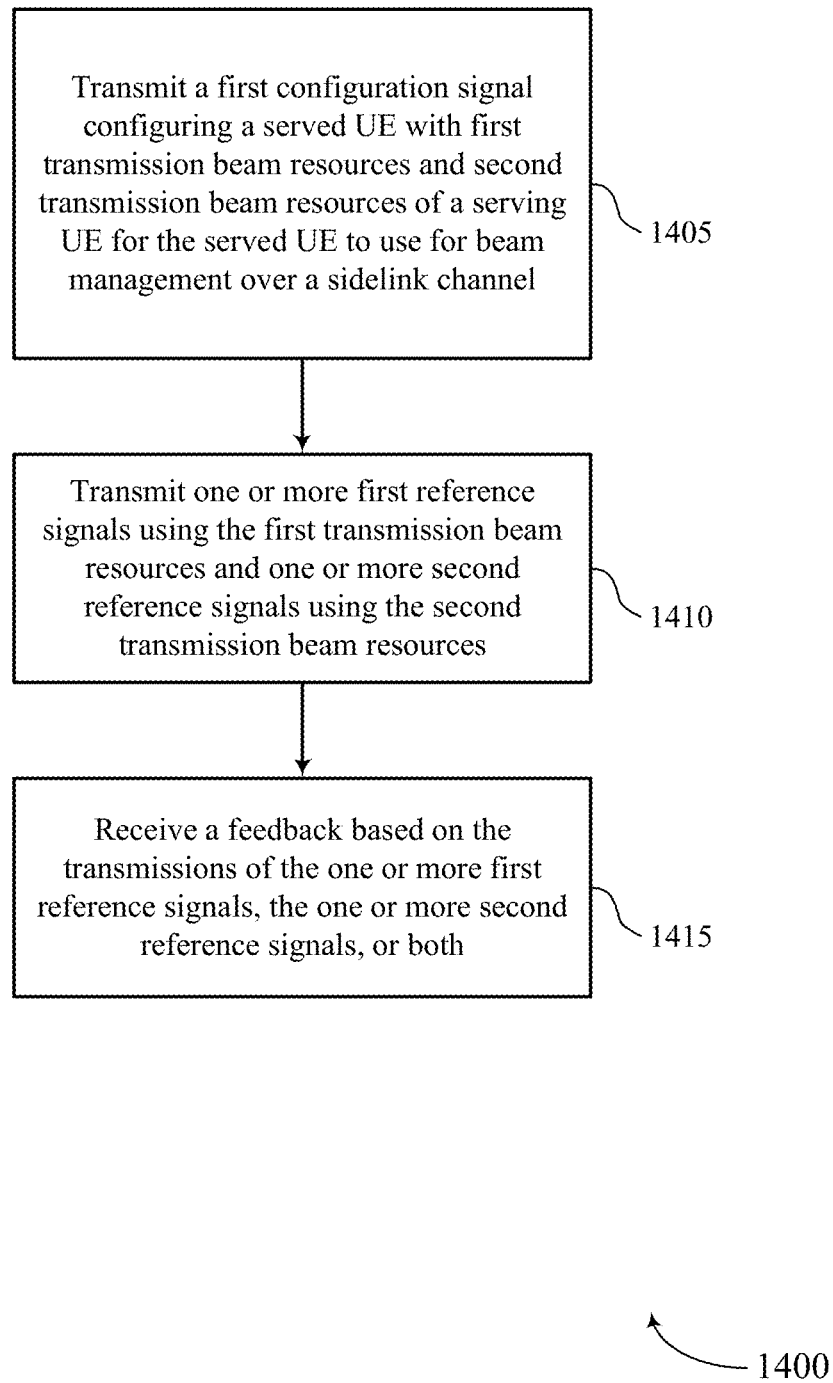

FIG. 14 shows a flowchart illustrating a method 1400 that supports joint transmit and receive beam-sweeping for sidelink in accordance with aspects of the present disclosure. The operations of method 1400 may be implemented by a UE 115 or its components as described herein. For example, the operations of method 1400 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1405, the UE may transmit, to a served UE and over a sidelink channel, a first configuration signal configuring the served UE with first transmission beam resources and second transmission beam resources of the serving UE for the served UE to use for beam management over the sidelink channel. The operations of 1405 may be performed according to the methods described herein. In some examples, aspects of the operations of 1405 may be performed by a configuration signal manager as described with reference to FIGS. 7 through 10.

At 1410, the UE may transmit one or more first reference signals using the first transmission beam resources and one or more second reference signals using the second transmission beam resources. The operations of 1410 may be performed according to the methods described herein. In some examples, aspects of the operations of 1410 may be performed by a beam management manager as described with reference to FIGS. 7 through 10.

At 1415, the UE may receive a feedback message from the served UE based on the transmissions of the one or more first reference signals, the one or more second reference signals, or both. The operations of 1415 may be performed according to the methods described herein. In some examples, aspects of the operations of 1415 may be performed by a feedback manager as described with reference to FIGS. 7 through 10.

Figure 15:
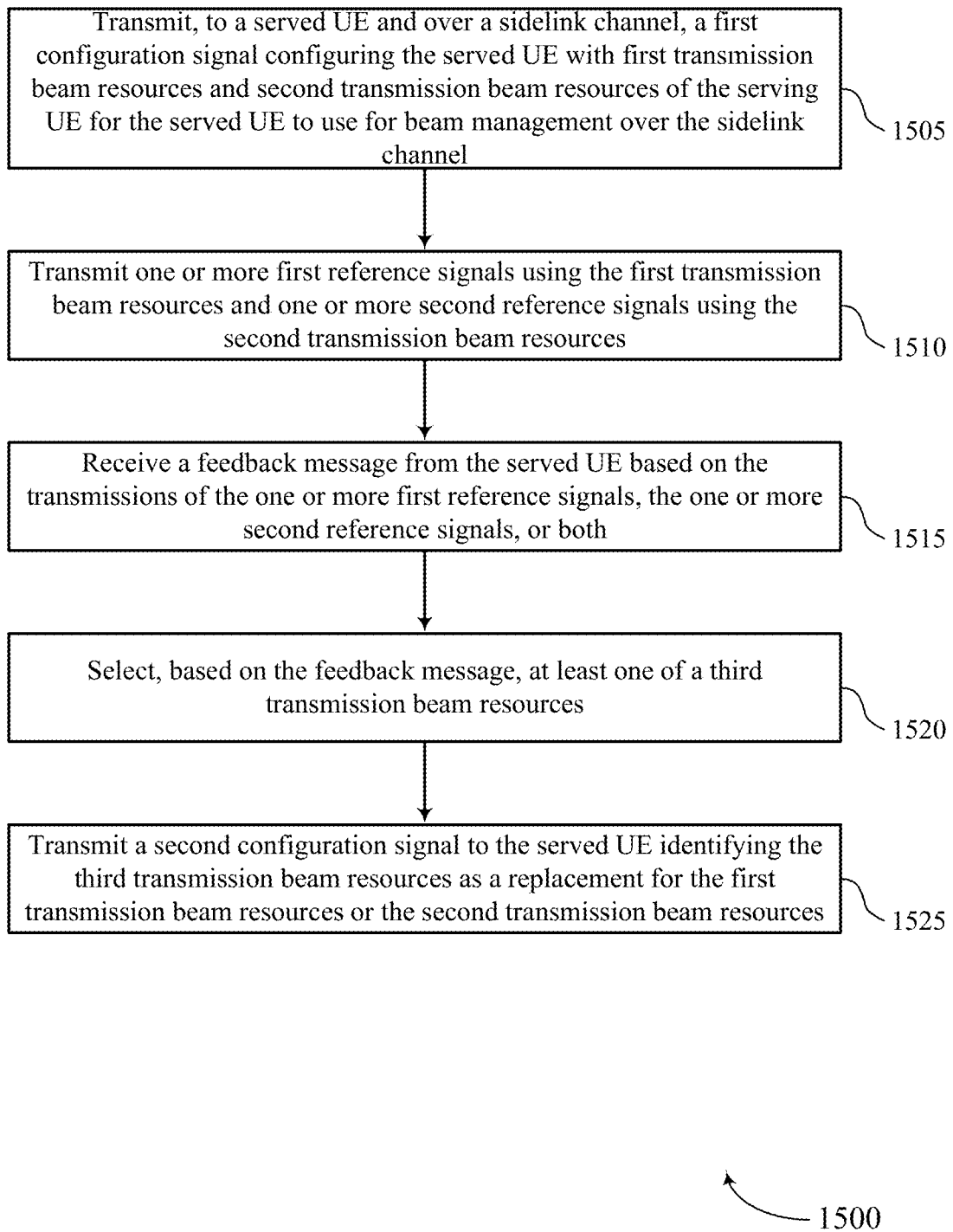

FIG. 15 shows a flowchart illustrating a method 1500 that supports joint transmit and receive beam-sweeping for sidelink in accordance with aspects of the present disclosure. The operations of method 1500 may be implemented by a UE 115 or its components or a base station 105 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may transmit (e.g., to a served UE, to a serving UE, over a sidelink channel, over a downlink channel, etc.) a first configuration signal configuring the served UE with first transmission beam resources and second transmission beam resources (e.g., of the serving UE) for the served UE to use for beam management over a sidelink channel. The operations of 1505 may be performed according to the methods described herein. In some examples, aspects of the operations of 1505 may be performed by a configuration signal manager as described with reference to FIGS. 7 through 10.

At 1510, the UE may transmit one or more first reference signals using the first transmission beam resources and one or more second reference signals using the second transmission beam resources. The operations of 1510 may be performed according to the methods described herein. In some examples, aspects of the operations of 1510 may be performed by a beam management manager as described with reference to FIGS. 7 through 10.

At 1515, the UE may receive a feedback message (e.g., from the served UE) based on the transmissions of the one or more first reference signals, the one or more second reference signals, or both. The operations of 1515 may be performed according to the methods described herein. In some examples, aspects of the operations of 1515 may be performed by a feedback manager as described with reference to FIGS. 7 through 10.

At 1520, the UE may select, based on the feedback message, at least one of a third transmission beam resources. The operations of 1520 may be performed according to the methods described herein. In some examples, aspects of the operations of 1520 may be performed by a reselection manager as described with reference to FIGS. 7 through 10.

At 1525, the UE may transmit a second configuration signal to the served UE identifying the third transmission beam resources as a replacement for the first transmission beam resources or the second transmission beam resources. The operations of 1525 may be performed according to the methods described herein. In some examples, aspects of the operations of 1525 may be performed by a reselection manager as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a served UE, comprising: receiving a first configuration signal configuring the served UE with first transmission beam resources and second transmission beam resources for the served UE to use for beam management over a sidelink channel; identifying, based at least in part on the first configuration signal, a pattern for performing beam management using the first transmission beam resources and the second transmission beam resources; and performing the beam management over the sidelink channel in accordance with the pattern using the first transmission beam resources and the second transmission beam resources.

Aspect 2: The method of aspect 1, wherein performing the beam management comprises: monitoring, using a first receive beam of the served UE, for reference signal transmissions based at least in part on the first transmission beam resources; and monitoring for a reference signal transmission based at least in part on the second transmission beam resources including repeated transmissions using a same antenna port.

Aspect 3: The method of aspect 2, wherein monitoring using the first receive beam is performed concurrently, consecutively, or using time-division multiplexing with monitoring for the reference signal transmission by sweeping a set of receive beams of the served UE.

Aspect 4: The method of any of aspects 2 through 3, further comprising: alternating between monitoring using the first receive beam and monitoring by sweeping the set of receive beams between successive symbols, or successive mini-slots, or successive slots, or successive subframes, or a combination thereof.

Aspect 5: The method of any of aspects 2 through 4, further comprising: transmitting a first feedback message identifying a result of the monitoring using the first receive beam; and transmitting a second feedback message identifying a result of the monitoring by sweeping the set of receive beams.

Aspect 6: The method of any of aspects 1 through 5, further comprising: identifying, based at least in part on monitoring using the first receive beam of the served UE, one or more transmit beam candidates from reference signal transmissions; transmitting a feedback message identifying the one or more transmit beam candidates; and resetting the second transmission beam resources based at least in part on the feedback message.

Aspect 7: The method of any of aspects 1 through 6, wherein performing the beam management comprises: monitoring for a first reference signal transmission based at least in part on the first transmission beam resources including first repeated transmissions using a same first antenna port; and monitoring for a second reference signal transmission based at least in part on the second transmission beam resources including second repeated transmissions using a same second antenna port.

Aspect 8: The method of aspect 7, wherein monitoring for the first reference signal transmission by sweeping a set of receive beams for the served UE is performed concurrently, consecutively, or using time-division multiplexing with monitoring for the second reference signal transmission by sweeping the set of receive beams.

Aspect 9: The method of any of aspects 7 through 8, further comprising: alternating between monitoring for the first reference signal transmission and monitoring for the second reference signal transmission between successive symbols, or successive mini-slots, or successive slots, or successive subframes, or a combination thereof.

Aspect 10: The method of any of aspects 7 through 9, further comprising: transmitting a first feedback message identifying a result of the monitoring for the first reference signal transmission; and transmitting a second feedback message identifying a result of the monitoring for the second reference signal transmission.

Aspect 11: The method of any of aspects 1 through 10, wherein performing the beam management comprises: monitoring, using a first receive beam of the served UE, for reference signal transmissions based at least in part on the first transmission beam resources; and monitoring for multiple instances of a second reference signal transmission based at least in part on the second transmission beam resources including repeated transmissions using a same antenna port.

Aspect 12: The method of aspect 11, wherein monitoring for the reference signal transmissions is performed concurrently, consecutively, or using time division multiplexing with monitoring for the multiple instances of the second reference signal transmission by sweeping a set of receive beams of the served UE.

Aspect 13: The method of any of aspects 11 through 12, further comprising: alternating between monitoring for the reference signal transmissions and monitoring for the multiple instances of the second reference signal transmission between successive symbols, or successive mini-slots, or successive slots, or successive subframes, or a combination thereof.

Aspect 14: The method of any of aspects 11 through 13, further comprising: transmitting a first feedback message identifying a result of the monitoring for the reference signal transmissions; transmitting a second feedback message identifying a result of the monitoring for the multiple instances of the second reference signal transmission; and resetting the second transmission beam resources based at least in part on at least one of the first feedback message, or the second feedback message, or a combination thereof.

Aspect 15: The method of any of aspects 11 through 14, wherein the first transmission beam resources correspond to a first plurality of reference signal resource sets; and the second transmission beam resources corresponding to a second plurality of reference signal resource sets.

Aspect 16: The method of any of aspects 1 through 15, wherein the first configuration signal configures the first transmission beam resources as a first set of reference signal resources and a second set of reference signal resources, and configures the second transmission beam resources as a third set of reference signal resources, with the second set of reference signal resources and the third set of reference signal resources being configured with repetition enabled for the beam management.

Aspect 17: The method of any of aspects 1 through 16, wherein the first transmission beam resources comprise a first channel state information reference signal (CSI-RS) resource set and the second transmission beam resources comprise a second CSI-RS resource set.

Aspect 18: The method of any of aspects 1 through 17, wherein the first transmission beam resources comprise a first subset of a channel state information reference signal (CSI-RS) resource set and the second transmission beam resources comprise a second subset of the CSI-RS resource set.

Aspect 19: A method for wireless communication, comprising: transmitting a first configuration signal configuring a served UE with first transmission beam resources and second transmission beam resources of a serving UE for the served UE to use for beam management over a sidelink channel; transmitting one or more first reference signals using the first transmission beam resources and one or more second reference signals using the second transmission beam resources; and receiving a feedback message based at least in part on the transmissions of the one or more first reference signals, the one or more second reference signals, or both.

Aspect 20: The method of aspect 19, further comprising: selecting, based at least in part on the feedback message, at least one of a third transmission beam resources; and transmitting a second configuration signal to the served UE identifying the third transmission beam resources as a replacement for the first transmission beam resources or the second transmission beam resources.

Aspect 21: The method of any of aspects 19 through 20, wherein receiving the feedback message comprises: receiving, based at least in part on the one or more first reference signals, a first feedback message; and receiving, based at least in part on the one or more second reference signals, a second feedback message.

Aspect 22: The method of any of aspects 19 through 21, wherein the transmissions of the one or more first reference signals and the one or more second reference signals are performed concurrently, consecutively, or using time-division multiplexing.

Aspect 23: The method of any of aspects 19 through 22, wherein the transmissions of the one or more first reference signals and the one or more second reference signals are performed between successive symbols, or successive mini-slots, or successive slots, or successive subframes, or a combination thereof.

Aspect 24: The method of any of aspects 19 through 23, wherein the first transmission beam resources comprise a first channel state information reference signal (CSI-RS) resource set and the second transmission beam resources comprise a second CSI-RS resource set.

Aspect 25: The method of any of aspects 19 through 24, wherein the first transmission beam resources comprise a first subset of a channel state information reference signal (CSI-RS) resource set and the second transmission beam resources comprise a second subset of the CSI-RS resource set.

Aspect 26: An apparatus for wireless communication at a served UE, comprising a processor; memory coupled with the processor; and instructions stored in the memory and executable by the processor to cause the apparatus to perform a method of any of aspects 1 through 18.

Aspect 27: An apparatus for wireless communication at a served UE, comprising at least one means for performing a method of any of aspects 1 through 18.

Aspect 28: A non-transitory computer-readable medium storing code for wireless communication at a served UE, the code comprising instructions executable by a processor to perform a method of any of aspects 1 through 18.

Aspect 29: An apparatus for wireless communication, comprising a processor; memory coupled with the processor; and instructions stored in the memory and executable by the processor to cause the apparatus to perform a method of any of aspects 19 through 25.

Aspect 30: An apparatus for wireless communication, comprising at least one means for performing a method of any of aspects 19 through 25.

Aspect 31: A non-transitory computer-readable medium storing code for wireless communication, the code comprising instructions executable by a processor to perform a method of any of aspects 19 through 25.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a served user equipment (UE), comprising:
    a processor,
    memory coupled with the processor; and
    instructions stored in the memory and executable by the processor to cause the apparatus to:
        receive a first configuration signal configuring the served UE with first transmission beam resources and second transmission beam resources for the served UE to use for beam management over a sidelink channel;
        identify, based at least in part on the first configuration signal, a pattern for performing beam management using the first transmission beam resources and the second transmission beam resources; and
        perform the beam management over the sidelink channel in accordance with the pattern using the first transmission beam resources and the second transmission beam resources.

2. The apparatus of claim 1, wherein the instructions to perform the beam management are executable by the processor to cause the apparatus to:
    monitor, using a first receive beam of the served UE, for reference signal transmissions based at least in part on the first transmission beam resources; and
    monitor for a reference signal transmission based at least in part on the second transmission beam resources including repeated transmissions using a same antenna port.

3. The apparatus of claim 2, wherein monitoring using the first receive beam is performed concurrently, consecutively, or using time-division multiplexing with monitoring for the reference signal transmission by sweeping a set of receive beams of the served UE.

4. The apparatus of claim 2, wherein the instructions are further executable by the processor to cause the apparatus to:
    alternate between monitoring using the first receive beam and monitoring by sweeping a set of receive beams between successive symbols, or successive mini-slots, or successive slots, or successive subframes, or a combination thereof.

5. The apparatus of claim 2, wherein the instructions are further executable by the processor to cause the apparatus to:
    transmit a first feedback message identifying a result of the monitoring using the first receive beam; and
    transmit a second feedback message identifying a result of the monitoring by sweeping a set of receive beams.

6. The apparatus of claim 2, wherein the instructions are further executable by the processor to cause the apparatus to:
    identify, based at least in part on monitoring using the first receive beam of the served UE, one or more transmit beam candidates from reference signal transmissions;
    transmit a feedback message identifying the one or more transmit beam candidates; and
    reset the second transmission beam resources based at least in part on the feedback message.

7. The apparatus of claim 1, wherein the instructions to perform the beam management are executable by the processor to cause the apparatus to:
    monitor for a first reference signal transmission based at least in part on the first transmission beam resources including first repeated transmissions using a same first antenna port; and
    monitor for a second reference signal transmission based at least in part on the second transmission beam resources including second repeated transmissions using a same second antenna port.

8. The apparatus of claim 7, wherein monitoring for the first reference signal transmission by sweeping a set of receive beams for the served UE is performed concurrently, consecutively, or using time-division multiplexing with monitoring for the second reference signal transmission by sweeping the set of receive beams.

9. The apparatus of claim 7, wherein the instructions are further executable by the processor to cause the apparatus to:
    alternate between monitoring for the first reference signal transmission and monitoring for the second reference signal transmission between successive symbols, or successive mini-slots, or successive slots, or successive subframes, or a combination thereof.

10. The apparatus of claim 7, wherein the instructions are further executable by the processor to cause the apparatus to:

transmit a first feedback message identifying a result of the monitoring for the first reference signal transmission; and transmit a second feedback message identifying a result of the monitoring for the second reference signal transmission.

11. The apparatus of claim 1, wherein the instructions to perform the beam management are executable by the processor to cause the apparatus to:

monitor, using a first receive beam of the served UE, for reference signal transmissions based at least in part on the first transmission beam resources; and monitor for multiple instances of a second reference signal transmission based at least in part on the second transmission beam resources including repeated transmissions using a same antenna port.

12. The apparatus of claim 11, wherein monitoring for the reference signal transmissions is performed concurrently, consecutively, or using time division multiplexing with monitoring for the multiple instances of the second reference signal transmission by sweeping a set of receive beams of the served UE.

13. The apparatus of claim 11, wherein the instructions are further executable by the processor to cause the apparatus to:

alternate between monitoring for the reference signal transmissions and monitoring for the multiple instances of the second reference signal transmission between successive symbols, or successive mini-slots, or successive slots, or successive subframes, or a combination thereof.

14. The apparatus of claim 11, wherein the instructions are further executable by the processor to cause the apparatus to:

transmit a first feedback message identifying a result of the monitoring for the reference signal transmissions;

transmit a second feedback message identifying a result of the monitoring for the multiple instances of the second reference signal transmission; and reset the second transmission beam resources based at least in part on at least one of the first feedback message, or the second feedback message, or a combination thereof.

15. The apparatus of claim 11, wherein:

the first transmission beam resources correspond to a first plurality of reference signal resource sets; and the second transmission beam resources corresponding to a second plurality of reference signal resource sets.

16. The apparatus of claim 1, wherein the first configuration signal configures the first transmission beam resources as a first set of reference signal resources and a second set of reference signal resources, and configures the second transmission beam resources as a third set of reference signal resources, with the second set of reference signal resources and the third set of reference signal resources being configured with repetition enabled for the beam management.

17. The apparatus of claim 1, wherein the first transmission beam resources comprise a first channel state information reference signal (CSI-RS) resource set and the second transmission beam resources comprise a second CSI-RS resource set.

18. The apparatus of claim 1, wherein the first transmission beam resources comprise a first subset of a channel state information reference signal (CSI-RS) resource set and the second transmission beam resources comprise a second subset of the CSI-RS resource set.

19. An apparatus for wireless communication, comprising:

a processor, memory coupled with the processor; and instructions stored in the memory and executable by the processor to cause the apparatus to:

transmit a first configuration signal configuring a served UE with first transmission beam resources and second transmission beam resources of a serving UE for the served UE to use for beam management over a sidelink channel;

transmit one or more first reference signals using the first transmission beam resources and one or more second reference signals using the second transmission beam resources; and receive a feedback message based at least in part on the transmissions of the one or more first reference signals, the one or more second reference signals, or both.

20. The apparatus of claim 19, wherein the instructions are further executable by the processor to cause the apparatus to:

select, based at least in part on the feedback message, at least one of a third transmission beam resources; and transmit a second configuration signal to the served UE identifying the third transmission beam resources as a replacement for the first transmission beam resources or the second transmission beam resources.

21. The apparatus of claim 19, wherein the instructions to receive the feedback message are executable by the processor to cause the apparatus to:

receive, based at least in part on the one or more first reference signals, a first feedback message; and receive, based at least in part on the one or more second reference signals, a second feedback message.

22. The apparatus of claim 19, wherein the transmissions of the one or more first reference signals and the one or more second reference signals are performed concurrently, consecutively, or using time-division multiplexing.

23. The apparatus of claim 19, wherein the transmissions of the one or more first reference signals and the one or more second reference signals are performed between successive symbols, or successive mini-slots, or successive slots, or successive subframes, or a combination thereof.

24. The apparatus of claim 19, wherein the first transmission beam resources comprise a first channel state information reference signal (CSI-RS) resource set and the second transmission beam resources comprise a second CSI-RS resource set.

25. The apparatus of claim 19, wherein the first transmission beam resources comprise a first subset of a channel state information reference signal (CSI-RS) resource set and the second transmission beam resources comprise a second subset of the CSI-RS resource set.

26. A method for wireless communication at a served user equipment (UE), comprising:

receiving a first configuration signal configuring the served UE with first transmission beam resources and second transmission beam resources for the served UE to use for beam management over a sidelink channel;

identifying, based at least in part on the first configuration signal, a pattern for performing beam management using the first transmission beam resources and the second transmission beam resources; and performing the beam management over the sidelink channel in accordance with the pattern using the first transmission beam resources and the second transmission beam resources.

27. The method of claim 26, wherein performing the beam management comprises:
- monitoring, using a first receive beam of the served UE, for reference signal transmissions based at least in part on the first transmission beam resources; and
- monitoring for a reference signal transmission based at least in part on the second transmission beam resources including repeated transmissions using a same antenna port.

28. The method of claim 27, wherein:
- monitoring using the first receive beam is performed concurrently, consecutively, or using time-division multiplexing with monitoring for the reference signal transmission by sweeping a set of receive beams of the served UE.

29. A method for wireless communication, comprising:
- transmitting a first configuration signal configuring a served UE with first transmission beam resources and second transmission beam resources of a serving UE for the served UE to use for beam management over a sidelink channel;
- transmitting one or more first reference signals using the first transmission beam resources and one or more second reference signals using the second transmission beam resources; and
- receiving a feedback message based at least in part on the transmissions of the one or more first reference signals, the one or more second reference signals, or both.

30. The method of claim 29, further comprising:
- selecting, based at least in part on the feedback message, at least one of a third transmission beam resources; and
- transmitting a second configuration signal to the served UE identifying the third transmission beam resources as a replacement for the first transmission beam resources or the second transmission beam resources.

* * * * *